United States Patent
Upadhyay et al.

(10) Patent No.: US 11,513,907 B2
(45) Date of Patent: Nov. 29, 2022

(54) METHOD AND SYSTEM FOR RESUMING INTERRUPTED DATABASE BACKUP OPERATIONS USING CHECKPOINTS

(71) Applicant: EMC IP Holding Company LLC, Hopkinton, MA (US)

(72) Inventors: Navneet Upadhyay, Ghaziabad (IN); Shelesh Chopra, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 235 days.

(21) Appl. No.: 16/782,100

(22) Filed: Feb. 5, 2020

(65) Prior Publication Data
US 2021/0240574 A1 Aug. 5, 2021

(51) Int. Cl.
*G06F 16/00* (2019.01)
*G06F 11/14* (2006.01)
*G06F 16/16* (2019.01)

(52) U.S. Cl.
CPC ........ *G06F 11/1461* (2013.01); *G06F 16/162* (2019.01); *G06F 2201/84* (2013.01)

(58) Field of Classification Search
CPC . G06F 11/1458; G06F 16/162; G06F 2201/84
USPC ........................................................ 707/645
See application file for complete search history.

(56) References Cited

U.S. PATENT DOCUMENTS

| | | | | | |
|---|---|---|---|---|---|
| 8,914,329 | B1 * | 12/2014 | Chandra | ............... | G06F 11/263 |
| | | | | | 707/654 |
| 8,924,355 | B1 * | 12/2014 | Kundzich | ........... | G06F 11/1458 |
| | | | | | 707/647 |
| 9,946,603 | B1 * | 4/2018 | Kumar | ................ | G06F 11/3079 |
| 10,108,502 | B1 * | 10/2018 | Gopinath | ............ | G06F 11/1451 |
| 10,409,691 | B1 * | 9/2019 | Patwardhan | ........ | G06F 11/1453 |

* cited by examiner

*Primary Examiner* — Monica M Pyo
(74) *Attorney, Agent, or Firm* — Chamberlain, Hrdlicka, White, Williams & Aughtry

(57) ABSTRACT

In general, the invention relates to a method for backing up data. The method includes receiving a backup instruction from a client device, wherein the backup instruction comprises a backup tag corresponding to a backup operation for a user asset, making a first determination that the backup tag matches a second backup tag specified in a tag file, and in response to the first determination, identifying a checkpoint of a backup associated with the second backup tag, and resuming the backup operation at the checkpoint for the user asset.

6 Claims, 14 Drawing Sheets

… (1)

METHOD AND SYSTEM FOR RESUMING INTERRUPTED DATABASE BACKUP OPERATIONS USING CHECKPOINTS

BACKGROUND

Database protection defines the process of protecting database data using a secondary storage. More specifically, protection of the database data often entails replicating database data, sending the replicated data to a secondary storage across a network, and storing the replicated data on the secondary storage.

SUMMARY

In general, in one aspect, the invention relates to a method for backing up data. The method includes receiving a backup instruction from a client device, wherein the backup instruction comprises a backup tag corresponding to a backup operation for a user asset, making a first determination that the backup tag matches a second backup tag specified in a tag file, and in response to the first determination, identifying a checkpoint of a backup associated with the second backup tag, and resuming the backup operation at the checkpoint for the user asset.

In general, in one aspect, the invention relates to a system that includes a processor and a client protection agent, which when executed by the processor performs a method. The method comprises receiving a backup instruction from a client device, wherein the backup instruction comprises a backup tag corresponding to a backup operation for a user asset, making a first determination that the backup tag matches a second backup tag specified in a tag file, and in response to the first determination, identifying a checkpoint of a backup associated with the second backup tag, and resuming the backup operation at the checkpoint for the user asset.

In general, in one aspect, the invention relates to a non-transitory computer readable medium which includes computer readable program code, which when executed by a computer processor enables the computer processor to perform a method. The method includes receiving a backup instruction from a client device, wherein the backup instruction comprises a backup tag corresponding to a backup operation for a user asset, making a first determination that the backup tag matches a second backup tag specified in a tag file, and in response to the first determination, identifying a checkpoint of a backup associated with the second backup tag, and resuming the backup operation at the checkpoint for the user asset.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for resuming interrupted database backup operations using checkpoints. Specifically, one or more embodiments of the invention enables the ability to resume database backup operations that were interrupted from a checkpoint. The resumed database backup operations, in contrast with restarting interrupted database backup operations from scratch, provides mechanisms through which interrupted database backup operations may be resumed from the last updated checkpoint associated with the interrupted backup operations. Additionally, both full and incremental database backup operations may be resumed from a checkpoint.

Figure 1A:
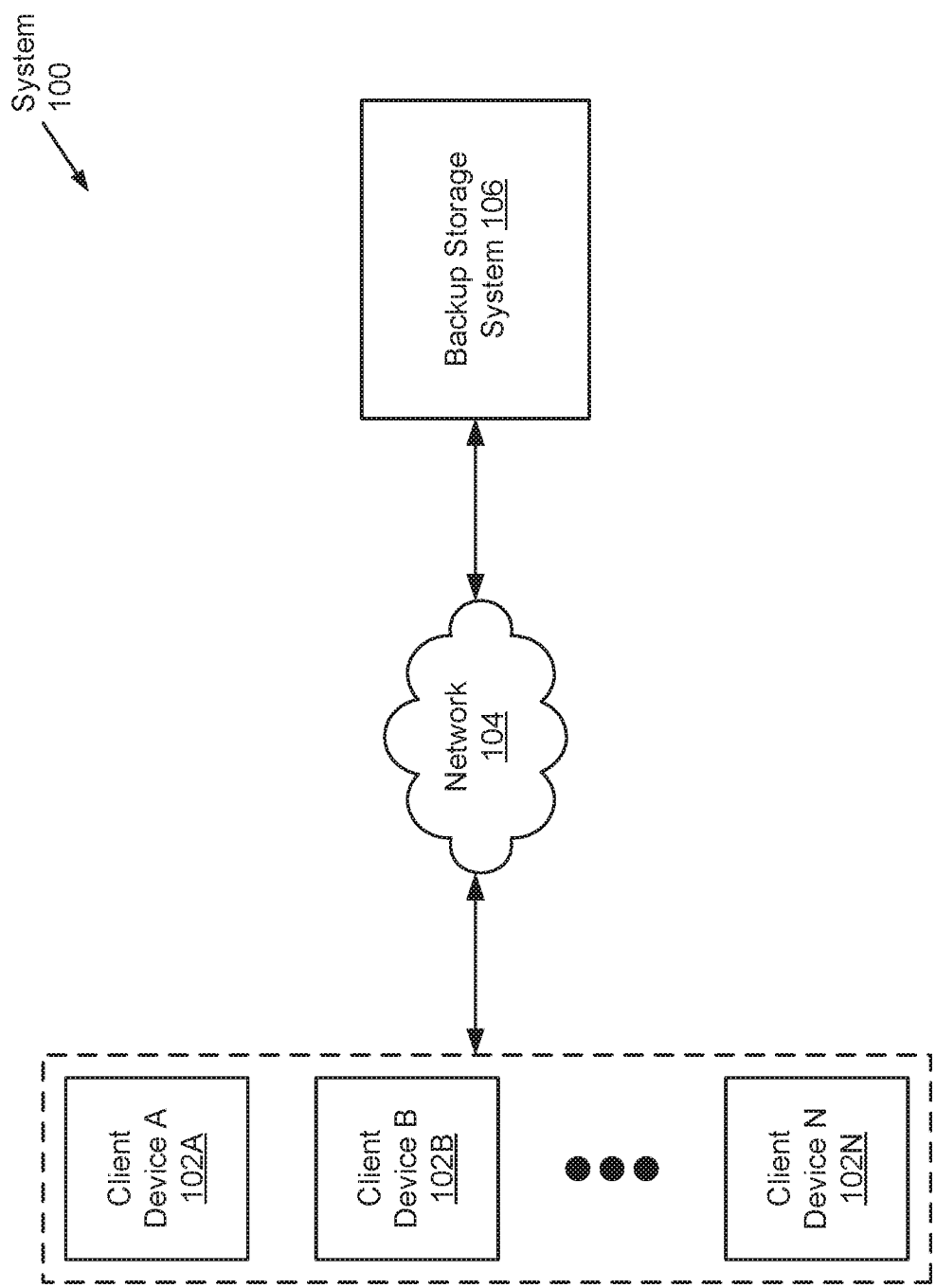
FIG. 1A shows a system in accordance with one or more embodiments of the invention.

FIG. 1A shows a system in accordance with one or more embodiments of the invention. The system (100) may include one or more client devices (102A-102N) operatively connected to a backup storage system (106). Each of these system (100) components is described below.

In one embodiment of the invention, the above-mentioned system (100) components may operatively connect to one another through a network (104) (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical appliance or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network (104). Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a server, a mainframe, or any other computing system similar to the exemplary computing system shown in FIG. 4. Moreover, client devices (102A-102N) are described in further detail below with respect to FIG. 1B.

In one embodiment of the invention, the backup storage system (106) may represent a data backup, archiving, and/or disaster recovery storage system. The backup storage system (106) may be implemented using one or more servers (not shown). Each server may refer to a physical server, which may reside in a datacenter, or a virtual server, which may reside in a cloud computing environment. Additionally or alternatively, the backup storage system (106) may be implemented using one or more computing systems similar to the exemplary computing system shown in FIG. 4. Furthermore, the backup storage system (106) is described in further detail below with respect to FIG. 1C.

While FIG. 1A shows a configuration of components, other system (100) configurations may be used without departing from the scope of the invention.

Figure 1B:
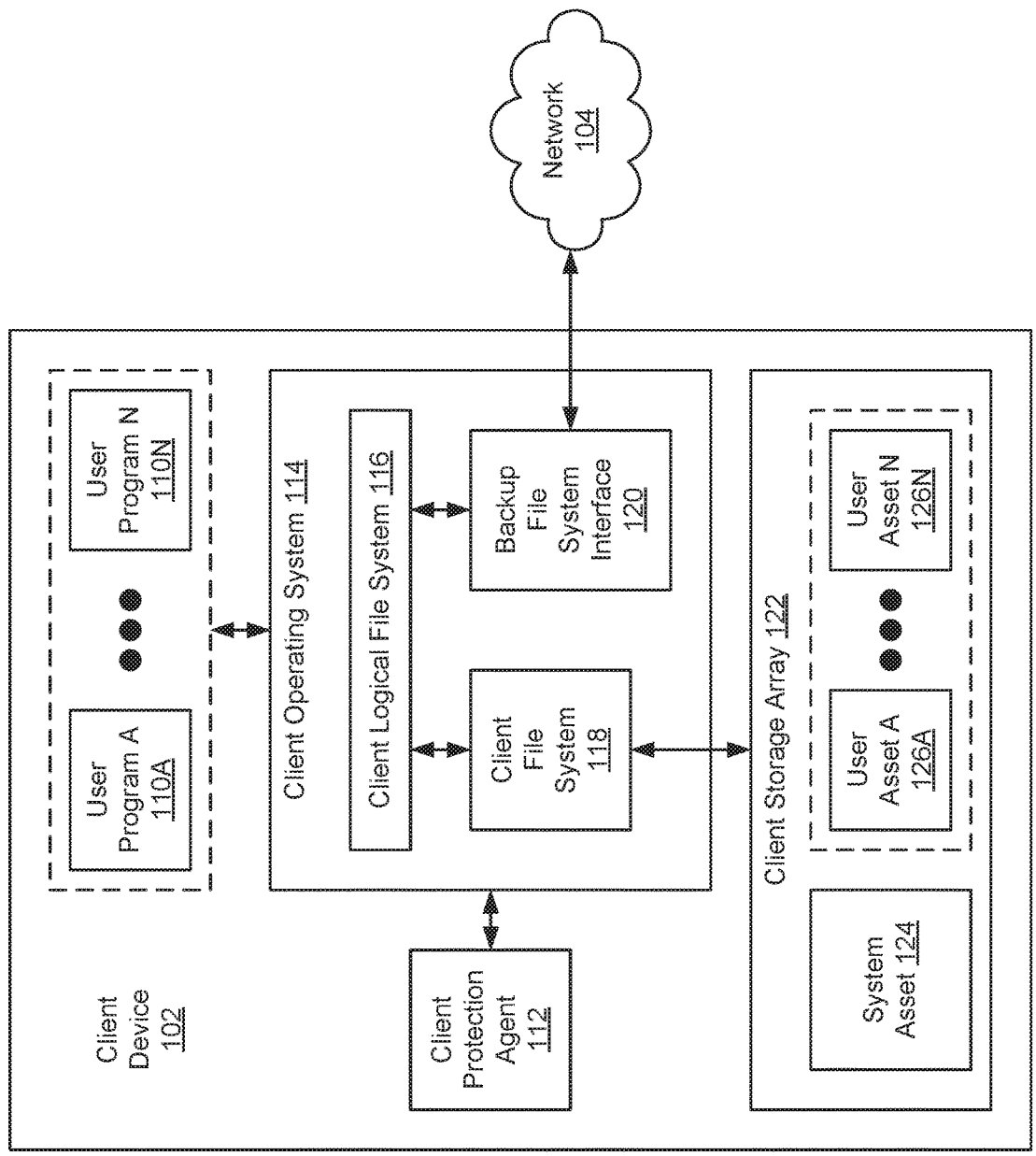
FIG. 1B shows a client device in accordance with one or more embodiments of the invention.

FIG. 1B shows a client device in accordance with one or more embodiments of the invention. The client device (102) may include one or more user programs (110A-110N), a client protection agent (112), a client operating system (114), and a client storage array (122). Each of these client device (102) components is described below.

In one embodiment of the invention, a user program (110A-110N) may refer to a computer program that may execute on the underlying hardware of the client device (102). Specifically, a user program (110A-110N) may be designed and configured to perform one or more functions, tasks, and/or activities instantiated by a user of the client device (102). Accordingly, towards performing these operations, a user program (110A-110N) may include functionality to request and consume client device (102) resources (e.g., computer processors, memory, storage (122), virtualization, network bandwidth, etc.) by way of service calls to the client operating system (114). One of ordinary skill will appreciate that a user program (110A-110N) may perform other functionalities without departing from the scope of the invention. Examples of a user program (110A-110N) may include, but are not limited to, a word processor, an email client, a database client, a web browser, a media player, a file viewer, an image editor, a simulator, a computer game, or any other computer executable application.

In one embodiment of the invention, the client protection agent (112) may refer to a computer program that may execute on the underlying hardware of the client device (102). Specifically, the client protection agent (112) may be designed and configured to perform client-side database backup and recovery operations. To that extent, the client protection agent (112) may protect one or more databases (also referred herein as system assets (124) and/or user assets (126A-126N)) on the client device (102) against data loss (i.e., backup the database(s)); and reconstruct one or more databases on the client device (102) following such data loss (i.e., recover the database(s)). One of ordinary skill will appreciate that the client protection agent (112) may perform other functionalities without departing from the scope of the invention.

In one embodiment of the invention, the client operating system (114) may refer to a computer program that may execute on the underlying hardware of the client device (102). Specifically, the client operating system (114) may be designed and configured to oversee client device (102) operations. To that extent, the client operating system (114) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (114) may perform other functionalities without departing from the scope of the invention.

For example, the client operating system (114) may facilitate user program (110A-110N) interaction with user asset (126A-126N) data stored locally on the client device (102) or remotely over the network (104). In facilitating the aforementioned interaction, the client operating system (114) may implement a client logical file system (116). The client logical file system (116) may represent a collection of in-memory data structures maintained, by the client operating system (114), to manage the various accessible user asset (126A-126N) data stored locally on the client device (102) and/or remotely on the backup storage system (106). Further, the client logical file system (116) may expose an application programming interface (API) through which the user program(s) (110A-110N) may manipulate—i.e., via one or more file operations—any granularity of locally and/or remotely stored user asset (126A-126N) data. These file operations, requested by the user program(s) (110A-110N), may subsequently be delivered to the client file system (118) or backup file system interface (120) for processing.

In one embodiment of the invention, the client file system (118) may represent a physical file system (also referred to as a file system implementation). A physical file system may refer to a collection of subroutines concerned with the physical operation of one or more physical storage devices (described below). The client file system (118), in this respect, may be concerned with the physical operation of the client storage array (122). Accordingly, the client file system (118) may employ client storage array (122) device drivers (or firmware) (not shown) to process requested file operations from the user program(s) (110A-110N). Device drivers enable the client file system (118) to manipulate physical storage or disk blocks as appropriate.

In one embodiment of the invention, the backup file system interface (120) may represent a computer program that may execute on the underlying hardware of the client device (102). Specifically, the backup file system interface (120) may be designed and configured to facilitate the access and manipulation of remotely stored database data as if the aforementioned database data were stored locally on the client device (102). Accordingly, the backup file system interface (120) may, in part, implement a distributed file system (DFS), which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device (102)) across the network (104). Furthermore, the backup file system interface (120) may include functionality to issue remote procedure calls (RPCs) directed to accessing and manipulating any granularity of database data remotely stored on the backup storage system (106). The invention is not limited to the aforementioned protocols.

In one embodiment of the invention, the client storage array (122) may refer to a collection of one or more physical storage devices (not shown) on which various forms of digital data—e.g., a system asset (124) and one or more user assets (126A-126N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (122) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a system asset (124) may represent a database, or a logical container to and from which related digital data, or any granularity thereof, may be stored and retrieved, respectively. A system asset (124) may occupy a portion of a physical storage device or, alternatively, may span across multiple physical storage devices, of the client storage array (122). Furthermore, a system asset (124) may refer to a composite of various database objects including, but not limited to, one or more recovery catalogs (not shown, discussed below).

In one embodiment of the invention, a recovery catalog may refer to a database object that stores backup operation metadata. The recovery catalog may include entries for one or more backup operations. The recovery catalog entries may include metadata that includes information regarding successfully backed-up data files associated with a backup operation. The metadata may include data file identifiers, user asset identifiers, data file storage locations, and/or other types of backup operation metadata without departing from the scope of the invention.

In one embodiment of the invention, an user asset (126A-126N) may represent a database, or a logical container to and from which related digital data, or any granularity thereof, may be stored and retrieved, respectively. An user asset (126A-126N) may occupy a portion of a physical storage device or, alternatively, may span across multiple physical storage devices, of the client storage array (122). Furthermore, an user asset (126A-126N) may refer to a composite of various database objects including, but not limited to, one or more data files, one or more control files, and one or more parameter files (all not shown). Each of these user asset (126A-126N) subcomponents is described below.

In one embodiment of the invention, a data file may refer to a database object that stores database data. Database data may encompass computer readable content (e.g., images, text, video, audio, machine code, any other form of computer readable content, or a combination thereof), which may be generated, interpreted, and/or processed by any given user program (110A-110N). Further, a data file may store database data in (a) undeduplicated form or (b) deduplicated form. In brief, the latter form of database data may be produced through the application of data deduplication on the former form of the database data. That is, undeduplicated database data may entail computer readable content that may or may not include redundant information. In contrast, deduplicated database data may result from the elimination of any redundant information found throughout the undeduplicated computer readable content and, accordingly, may instead reflect a content recipe of the undeduplicated computer readable content (described above). A content recipe may refer to a sequence of chunk identifiers (or pointers) associated with (or directed to) unique database data chunks consolidated in physical storage. Collectively, the sequence of chunk identifiers (or pointers)—representative of the deduplicated database data—may be used to reconstruct the corresponding undeduplicated database data. Moreover, a given chunk identifier for a given database data chunk may encompass a cryptographic fingerprint or hash of the given database data chunk.

In one embodiment of the invention, a control file may refer to a database object that stores user asset (126A-126N) metadata (also referred to as database metadata). Database metadata may encompass information descriptive of the database (or user asset (126A-126N)) status and structure. By way of examples, database metadata may include, but are not limited to, a database name assigned to the user asset (126A-126N), the name(s) and storage location(s) of one or more data files and redo log files associated with the user asset (126A-126N), a creation timestamp encoding the date and/or time marking the creation of the user asset (126A-126N), a log sequence number associated with a current redo log file, etc.

In one embodiment of the invention, a parameter file may refer to a database object that stores parameters of user assets (126A-126N). A parameter file may include a list of initialization parameters and a value for each parameter for a particular user asset (126A-126N). A parameter file may serve to recover the user asset (126A-126N) should a failover occur, or to apply initialization parameter values to a recovered user asset (126A-126N) which may have transpired during the database recovery process.

While FIG. 1B shows a configuration of components, other client device (102) configurations may be used without departing from the scope of the invention.

Figure 1C:
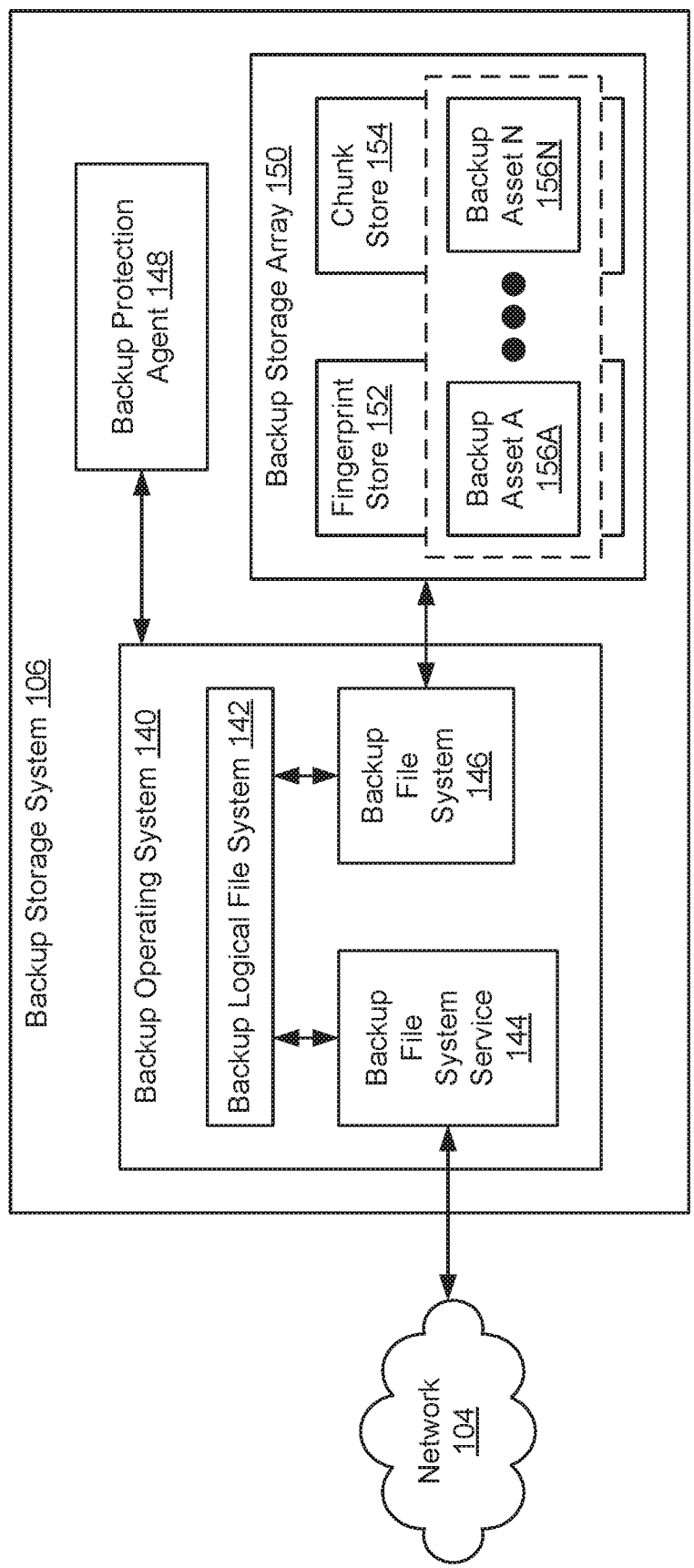
FIG. 1C shows a backup storage system in accordance with one or more embodiments of the invention.

FIG. 1C shows a backup storage system in accordance with one or more embodiments of the invention. The backup storage system (106) may include a backup operating system (140), a backup protection agent (148), and a backup storage array (150). Each of these backup storage system (106) components is described below.

In one embodiment of the invention, the backup operating system (140) may refer to a computer program that may execute on the underlying hardware of the backup storage system (106). Specifically, the backup operating system (140) may be designed and configured to oversee backup storage system (106) operations. To that extent, the backup operating system (140) may include functionality to, for example, support fundamental backup storage system (106) functions; schedule tasks; mediate interactivity between logical (e.g., software) and physical (e.g., hardware) backup storage system (106) components; allocate backup storage system (106) resources; and execute or invoke other computer programs executing on the backup storage system (106). One of ordinary skill will appreciate that the backup operating system (140) may perform other functionalities without departing from the scope of the invention.

For example, the backup operating system (140) may facilitate backup asset (156A-156N) access and manipulation by one or more computer programs (e.g., backup protection agent (148)) executing locally on the backup storage system (106) or, alternatively, by one or more remote computing systems (e.g., client device(s) (102A-102N)) over the network (104). In facilitating the aforementioned interaction, the backup operating system (140) may implement a backup logical file system (142). The backup logical file system (142) may represent a collection of in-memory data structures maintained, by the backup operating system (140), to manage the various accessible backup asset (156A-156N) data stored locally on the backup storage system (106). Further, the backup logical file system (142) may expose an application programming interface (API) through which the local computer programs and/or remote computing systems may manipulate—i.e., via one or more file operations—any granularity of locally stored backup asset (156A-156N) data. File operations, requested by the local computer programs, may be delivered to the backup file system (146) for processing, whereas file operations, requested by the remote computing systems, may be received and processed by the backup file system service (144). Furthermore, the backup logical file system (142) is described in further detail below with respect to FIG. 1D.

In one embodiment of the invention, the backup file system service (144) may represent a computer program that may execute on the underlying hardware of the backup storage system (106). Specifically, the backup file system service (144) may be designed and configured to facilitate the authorized, remote access and manipulation of locally stored backup database data. Accordingly, the backup file system service (144) may, in part, implement a DFS, which may employ any known DFS protocol (e.g., the network file system (NFS) protocol). A DFS may refer to a mechanism through which files (e.g., database data) may be stored and accessed based on client-server architecture over a network (104). Particularly, in a DFS, one or more central appliances (e.g., the backup storage system (106)) store files that can be accessed, with proper authorization permissions, by any number of remote clients (e.g., the client device(s) (102A-102N)) across the network (104). Furthermore, the backup file system service (144) may include functionality to service remote procedure calls (RPCs) directed to accessing and manipulating any granularity of backup database data locally stored on the backup storage system (106). The invention is not limited to the aforementioned protocols.

In one embodiment of the invention, the backup file system (146) may represent a physical file system (also referred to as a file system implementation). A physical file system may refer to a collection of subroutines concerned with the physical operation of one or more physical storage devices (described below). The backup file system (146), in this respect, may be concerned with the physical operation of the backup storage array (150). Accordingly, the backup file system (146) may employ backup storage array (150) device drivers (or firmware) (not shown) to process requested file operations from the local computer programs or the remote computing systems (via the backup file system service (144)). Device drivers enable the backup file system (146) to manipulate physical storage or disk blocks as appropriate.

In one embodiment of the invention, the backup protection agent (148) may refer to a computer program that may execute on the underlying hardware of the backup storage system (106). Specifically, the backup protection agent (148) may be designed and configured to perform server-side database backup and recovery operations. To that extent, the backup protection agent (148) may receive database data, submitted by the client device(s) (102A-102N), to store as backup assets (156A-156N) on the backup storage array (150) during database backup operations; and, conversely, may retrieve backup database data from the backup storage array (150) during database recovery operations. One of ordinary skill will appreciate that the backup protection agent (148) may perform other functionalities without departing from the scope of the invention.

In one embodiment of the invention, the backup storage array (150) may refer to a collection of one or more physical storage devices (not shown) on which various forms of digital data—e.g., one or more backup assets (156A-156N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (150) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the backup storage array (150) may include a fingerprint store (152) and a chunk store (154), which may collectively include deduplicated database data. Recall from above (see e.g., FIG. 1B), that deduplicated database data may result from the elimination of any redundant information found throughout the database data in undeduplicated form. Accordingly, instead of reflecting the binary composition of the undeduplicated database data in its entirety, deduplicated database data may alternatively reflect reduced information in the form of a content recipe of the representative, undeduplicated computer readable content. The aforementioned content recipe may refer to a sequence of chunk identifiers (or pointers) associated with (or directed to) unique database data chunks identified throughout the undeduplicated database data. Any unique database data chunks, along with their respective chunk identifiers (i.e., cryptographic fingerprints or hashes), may be indexed in appropriate physical storages—e.g., the chunk store (154) and the fingerprint store (152), respectively.

In one embodiment of the invention, the fingerprint store (152) may represent a repository for maintaining chunk identifiers. Each chunk identifier may be indexed by way of a fingerprint store (152) entry (not shown), which may store a mapping relating the chunk identifier to a storage identifier. A chunk identifier (also referred to as a fingerprint or hash) may represent a digital signature that uniquely identifies an associated database data chunk. Further, a chunk identifier may be produced by submitting the associated database data chunk through a hash function, which may employ any existing cryptographic mapping algorithm. As such, a chunk identifier may be outputted by the hash function given the associated database data chunk as input. Meanwhile, a storage identifier may represent a character or bit string that uniquely identifies a storage location in the backup storage array (150). By way of an example, a storage identifier may encompass a tuple reflecting (a) a storage device identifier uniquely assigned to a given physical storage device (not shown) of the backup storage array (150); and (b) a binary address assigned to a starting byte (or storage block) in the given physical storage device at which the database data chunk may be physically stored.

On the other hand, in one embodiment of the invention, the chunk store (154) may represent a repository for maintaining unique database data chunks. Each unique database data chunk may be indexed by way of a chunk store (154) entry (not shown), which may store a mapping relating a storage identifier (described above) to the unique database data chunk. A database data chunk may refer to a fragment or a partition of deduplicated database data. More specifically, a database data chunk may capture a unique byte pattern that may occur or recur throughout the undeduplicated database data.

In one embodiment of the invention, a backup asset (156A-156N) may refer to a deduplicated backup copy of a given asset (126A-126N) (see e.g., FIG. 1B). For example, a backup asset (156A-156N) may represent a database, or a logical container to and from which related digital data, or any granularity thereof, may be stored and retrieved, respectively. A backup asset (156A-156N) may occupy a portion of a physical storage device or, alternatively, may span across multiple physical storage devices, of the backup storage array (150). Furthermore, a backup asset (156A-156N) may include a combination of various database objects including, but not limited to, one or more data files, one or more control files, one or more parameter files (all described above), and one or more tag files (described below).

In one embodiment of the invention, a tag file may refer to a database object for storing status parameters and identification information regarding backup operations. The tag file may include a backup tag, a full backup status/checkpoint (FBSC), and/or an incremental backup status/checkpoint (IBSC). The backup tag may be an identifier used to identify a particular backup operation. The FBSC may include status and/or checkpoint information for a particular full backup operation. The IBSC may include status and/or checkpoint information for an incremental backup operation. The FBSC and IBSC may be used to determine where in a backup operation to resume an interrupted backup operation.

While FIG. 1C shows a configuration of components, other backup storage system (106) configurations may be used without departing from the scope of the invention.

Figure 1D:
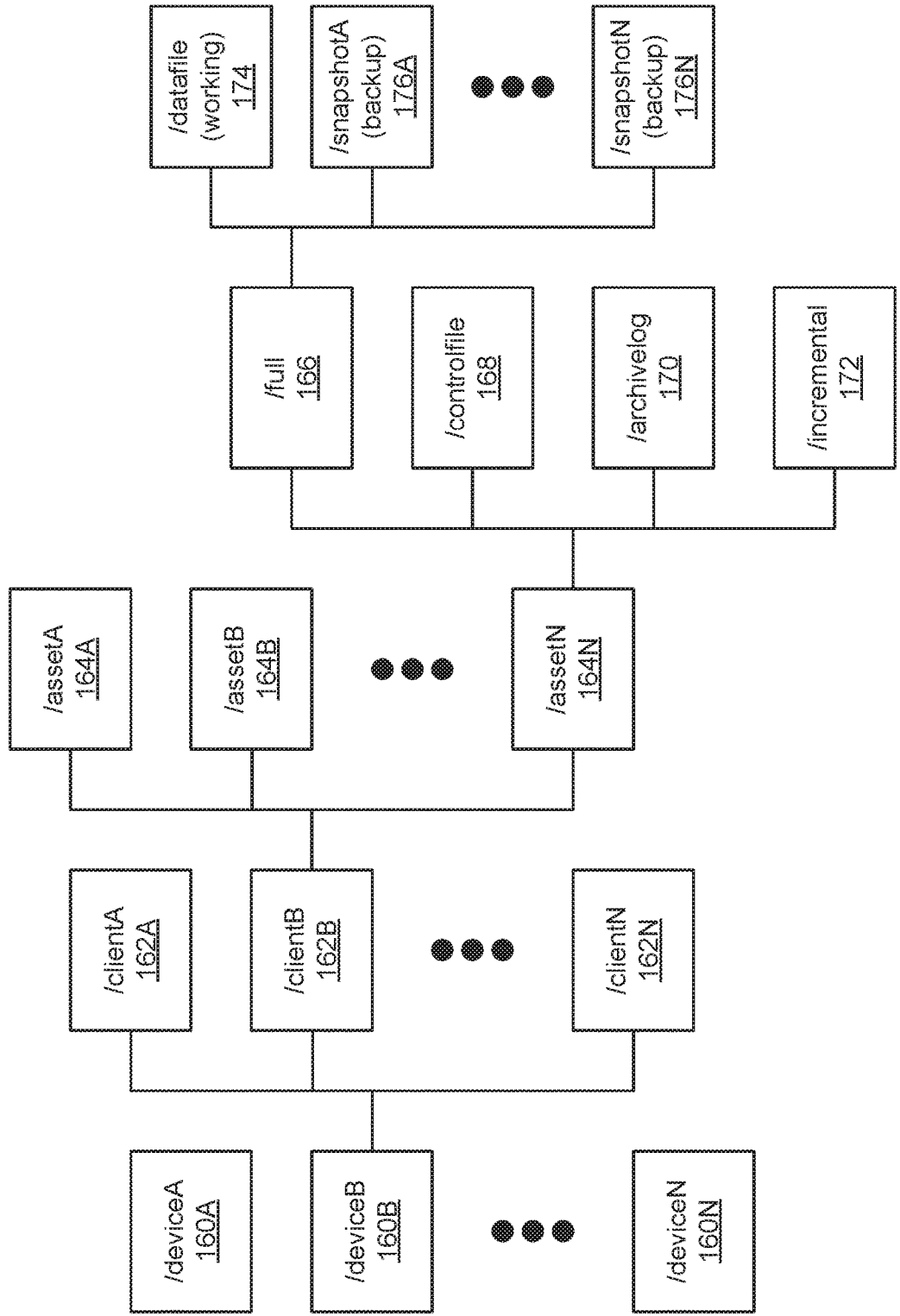
FIG. 1D shows an exemplary backup logical file system in accordance with one or more embodiments of the invention.

FIG. 1D shows an exemplary backup logical file system in accordance with one or more embodiments of the invention. A backup logical file system (142) may include one or more directories. In one embodiment of invention, a directory may be a file system cataloguing structure which includes references to other data files and/or other directories. Files may be organized by storing related files in the same directory. The backup logical file system (142) may include a one or more directory hierarchies. In other words, there may be one or more directories that include subdirectories, (i.e., directories inside directories).

The backup logical file system (142) may include one or more storage device directories (i.e., /deviceA-/deviceN (160A-160N)). Each storage device directory (160A-160N) may include one or more client device directories (i.e., /clientA-/clientN (162A-162N)). Each client device directory (162A-162N) may include one or more asset directories (i.e., /assetA-/assetN (164A-164N)). Each asset directory (164A-164N) may include a full backup directory (i.e., /full (166)), a control file directory (i.e., /controlfile (168)), an archive log directory (i.e., /archivelog (170)), and an incremental backup directory (i.e., /incremental (172)). The full backup directory (166) may include a data file directory, or working directory, (i.e., /datafile (174)), and one or more snapshot, or backup, directories (i.e., /snapshotA-/snapshot (176A-176N)). Each directory and subdirectory is discussed below.

In one embodiment of the invention, a device directory (160A-160N) may refer to a directory that includes all of the backup data stored on a storage device of the backup storage system (106). As discussed above, the backup storage system (106) may include one or more servers or computing devices. A device directory (160A-160N) may include all of the backup data stored on a server or computing device including backup data from one or more client devices (102A-102N) and one or more user assets (126A-126N).

In one embodiment of the invention, a client directory (162A-162N) may refer to a directory that includes all of the backup data stored on a storage device of the backup storage system (106) that is associated with a particular client device (102A-102N). As discussed above, there may be one or more client devices (102A-102N) that store backup data into the backup storage system. The backup data stored in a client directory may be associated with one or more user assets (126A-126N) on the client device associated with the client directory (162A-162N).

In one embodiment of the invention, an asset directory (164A-164N) may refer to a directory that includes all backup data associated with a particular user asset (126A-126N). As discussed above, there may be one or more user assets (126A-126N) from which backup data is stored in the backup storage system (106).

In one embodiment of the invention, a full backup directory (166) may refer to a directory that includes all data associated with full image backups. A full backup directory my include a data file directory (174) (also referred to as a working directory) and one or more snapshot directories (176A-176N) (also referred to as backup directories). A full backup directory (166) may include one or more tag files, one or more full backup data file images of user asset (126A-126N) data files, one or more clones of full backup data file images of user asset (126A-126N), one or more control file image backups, and one or more parameter file image backups (all not shown).

In one or more embodiment of the invention, a control file directory may refer to a directory that includes all of the backup control file images associated with an user asset (126A-126N). A control file directory may include any number of backup control file images associated with an user asset (126A-126N) that are also associated with particular point in time.

In one embodiment of the invention, an archive log directory (170) may refer to a directory that includes all archive log file images associated with an user asset (126A-126N). An archive log file directory may include any number of backup archive log file images associated with an user asset (126A-126N) that are also associated with particular point in time.

In one embodiment of the invention, an incremental backup directory (172) may refer to a directory that includes unmerged incremental data file images associated with an user asset (126A-126N). Incremental data file images may be stored in the incremental backup directory before being merged with existing full data file images to generate new full data file images in the data file (working) directory.

In one embodiment of the invention, a data file (working) directory (174) may refer to a directory in which all full backup data file images from the client device are written into and cloned from during backup operations.

In one embodiment of the invention, a snapshot (backup) directory (176A-176N) may refer to a directory in which clones of full backup data file images, control file images, and/or parameter file images are stored. Each snapshot directory (176A-176N) may be used to restore an associated user asset (126A-126N) to a point in time associated with the backup data image files.

While FIG. 1D shows a configuration of components, other backup logical file system (142) configurations may be used without departing from the scope of the invention.

FIGS. 2A-2D show flowcharts describing a method for resuming interrupted database full backup operations using checkpoints in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Figure 2A:
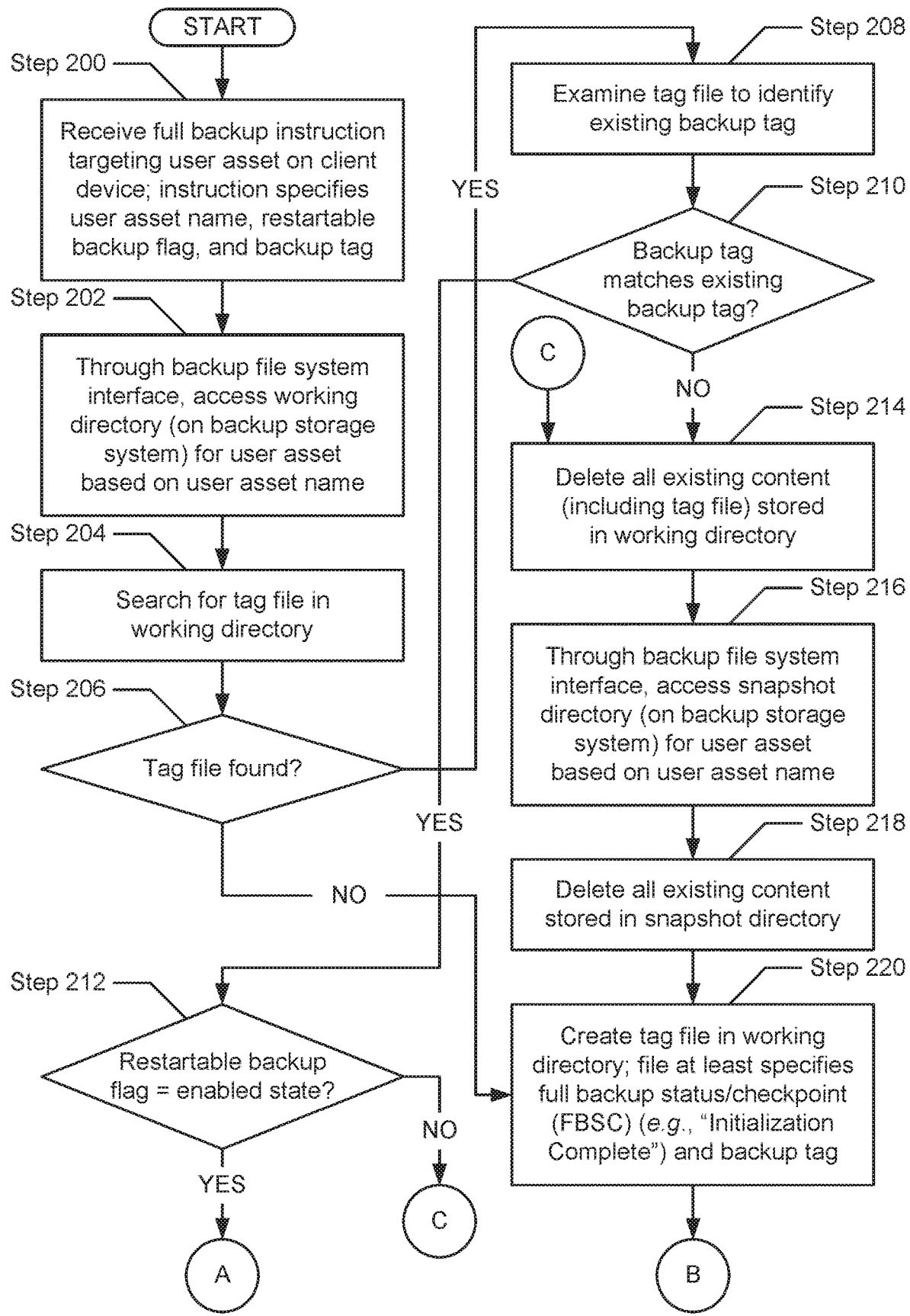
FIGS. 2A-2D show flowcharts describing a method for resuming interrupted database full backup operations using checkpoints in accordance with one or more embodiments of the invention.

Turning to FIG. 2A, in Step 200, a full backup instruction targeting an user asset on a client device is received. In one embodiment of the invention, the instruction may specify the user asset name, restartable backup flag, and backup tag. The user asset name may be an identifier unique to each user asset on the client device that may be used to specify a particular user asset. The restartable backup flag may include a binary value or parameter that may be enabled or disabled, which may indicate whether the previous existing backup was configured to be restartable. The backup tag may be used to identify backup operations and may include associated backup operation information.

In Step 202, a working directory (on the backup storage system) for an user asset is accessed based on the user asset name through the backup file system interface. In one or more embodiments of the invention, the backup file system interface allows the client device and entities within to access and manipulate directories and files on the backup storage system. The client device or entities on the client device may use an user asset name to identify and access the working directory associated with the full backup operation.

In Step 204, a tag file in the working directory is searched for. In one embodiment of the invention, the tag file may include metadata regarding the backup operations and associated data within the working directory. The tag file may at least specify one or more existing backup tags.

In Step 206, a determination is made as to whether the tag file is found. Accordingly, in one embodiment of the invention, if it is determined that the tag file is found, then the method proceeds to Step 208. On the other hand, in another embodiment of the invention, if it is alternatively determined that the tag file is not found, then the method proceeds to Step 220.

In Step 208, the tag file is examined to identify the existing backup tag. The existing backup tag may encode existing backup operation identifiers that may be used to verify if a new backup operation is restarting the existing backup operation. For example, if the backup tag located on the tag file in the working directory matches the backup tag included in the full backup instruction (obtained in Step 200), then the current backup operation may be targeting user asset data that may have been already backed up in the previous backup operation. On the other hand, if the backup tags (from the full backup instruction and the working directory) do not match, then the current backup operation may be targeting user asset data that has not been backed-up or is not associated with the user asset data currently in the working directory.

In Step 210, a determination is made as to whether the backup tag matches the existing backup tag. Accordingly, in one embodiment of the invention, if it is determined that the backup tag matches the existing backup tag, then the method proceeds to Step 212. On the other hand, in another embodiment of the invention, if it alternatively determined that the backup does not tag match the existing backup tag, then the method proceeds to Step 214.

In Step 212, a determination is made as to whether the restartable backup flag is in the enabled state. Accordingly, in one embodiment of the invention, if it is determined that the restartable backup flag is in the enabled state, then the method proceeds to Step 230 of FIG. 2B. On the other hand, in another embodiment of the invention, if it is alternatively determined that the restartable backup flag is not in the enabled state (i.e., the restartable backup flag is in the disabled state), then the method proceeds to Step 214.

In Step 214, in response to the backup tag not matching the existing backup tag or the restartable backup flag not being in the enabled state, all existing content (including the tag file) stored in the working direct is deleted. The full backup operation may be start from the beginning and not use any checkpoints. In one embodiment of the invention, there may be existing content from a previous backup operation in the working directory. In order to avoid any data loss or data corruption, all contents in the working directory may be deleted. The contents may include full backup data file images and tag files from a previous backup operation. The contents that may be deleted may include other data and/or files without departing from the scope of the invention.

In Step 216, a snapshot directory on the backup storage system for an user asset is accessed based on the user asset name through the backup file system interface. In one embodiment of the invention, the backup file system interface allows the client device and entities within to access and manipulate directories and files on the backup storage system. The user asset name may be a unique identifier that may be used to identify the aforementioned snapshot directory.

In Step 218, all existing content stored in the snapshot directory is deleted. The full backup operation may be start from the beginning and not use any checkpoints. In one or more embodiments of the invention, there may be existing content from a previous backup operation in the snapshot directory. In order to avoid any data loss or data corruption, all contents in the snapshot directory may be deleted. The contents may include full backup data file images, tag files, and control files from a previous backup operation. The contents that may be deleted may include other data and/or files without departing from the scope of the invention.

In Step 220, a tag file is created in the working directory. In one embodiment of the invention, the tag file may at least specify the full backup status/checkpoint (FBSC) (e.g., "Initialization Complete") and the backup tag. As discussed above, the backup tag may be used to identify and/or differentiate backup operations. The FBSC may be used to store and obtain the status or last completed checkpoint of the associated backup operation. The checkpoint "Initialization Complete" may convey the backup operation has been initiated, but no further actions in the operation have been successfully completed. The tag file may include other information without departing from the scope of the invention.

Figure 2B:
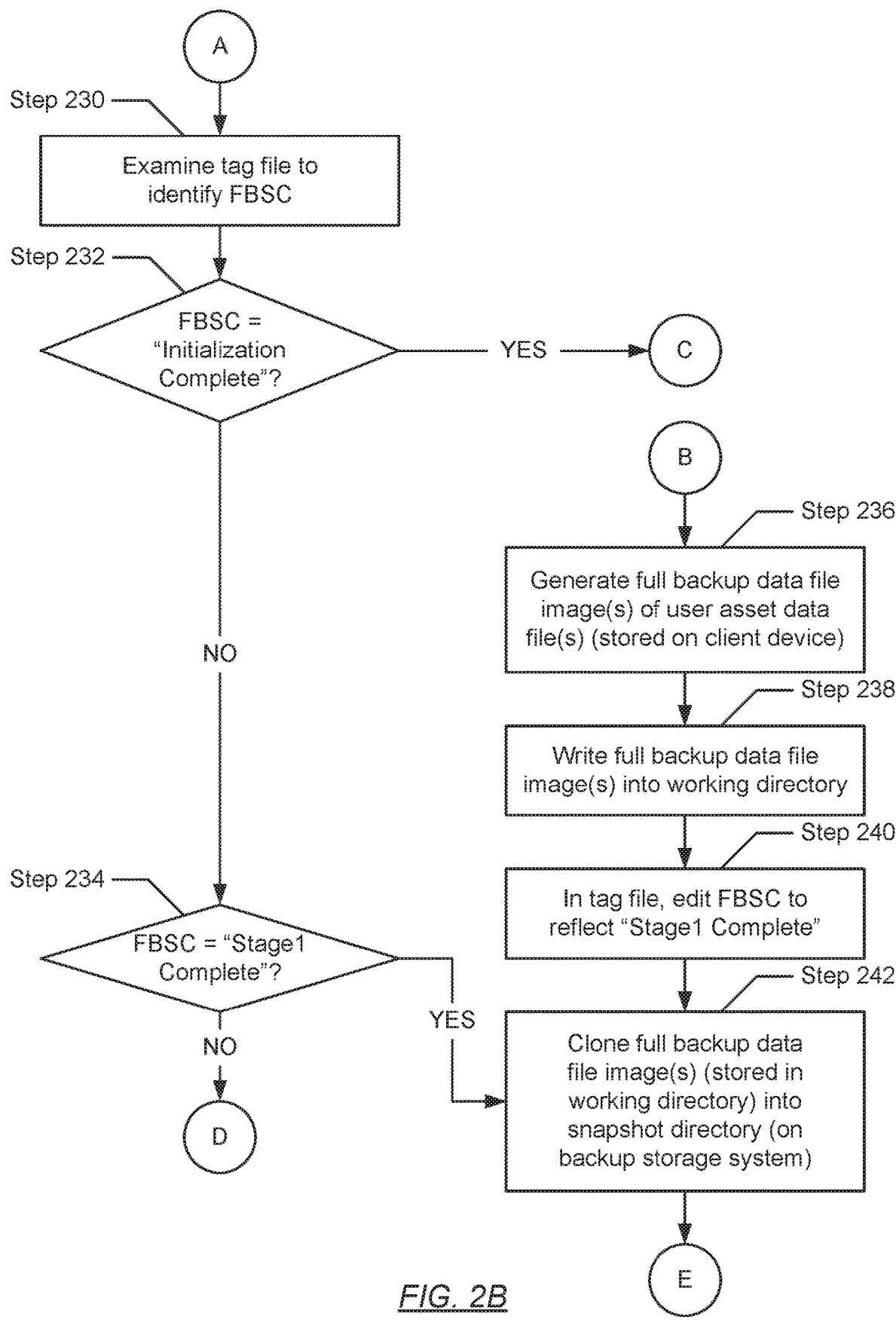

Turning to FIG. 2B, in Step 230, the tag file is examined to identify the FBSC. In one or more embodiments of the invention, the FBSC may refer to an object that references the status of the full backup operation. The status may include checkpoints that indicate the current progress of the full backup operation process. The backup operation may include several checkpoints. The checkpoints may include "Initialization Complete" (described above), "Stage1 Complete", "Stage2 Complete", "Stage3 Complete", "Stage4 Complete", and "Full Complete" (described below).

In Step 232, a determination is made as to whether the FBSC is "Initialization Complete". Accordingly, in one embodiment of the invention, if it is determined that the FBSC is "Initialization Complete", then the method proceeds to Step 214 of FIG. 2A. On the other hand, in another embodiment of the invention, if it is alternatively determined that the FBSC is not "Initialization Complete", then the method proceeds to Step 234.

In Step 234, a determination is made as to whether the FBSC is "Stage1 Complete". Accordingly, in one embodiment of the invention, if it is determined that the FBSC is "Stage1 Complete", then the method proceeds to Step 242. On the other hand, in another embodiment of the invention, if it is alternatively determined that the FBSC is not "Stage1 Complete", then the method proceeds to Step 250 of FIG. 2C.

In Step 236, a full backup data file image(s) of the user asset data file(s) stored on the client device is generated. The full backup data file image(s) may reflect all database data of the data files stored on the client device. Further, the full backup data file image(s) may be in deduplicated form and, thus, may include a content recipe (described above). In one embodiment of the invention, the content recipe may convey a sequence of fingerprints collectively representative of the undeduplicated full backup content.

In Step 238, the full backup data file image(s) is written into the working directory. In one or more embodiments of the invention, the full backup data file image(s) may be written into the working directory serially or in parallel. Writing full backup data file image(s) serially may include writing full backup data file images, if there are more than one, one by one. For example, the first full backup data file image is written into the working directory. After the first full backup data file image is successfully written into the working directory, then the second full backup data file image is written into the working directory and so on until all of the full backup data file images are successfully written into the working directory. Writing full backup data file images in parallel may include writing all of the full backup data file images into the working directory at the same time.

In Step 240, the FBSC in the tag file is edited (or otherwise updated) to reflect "Stage1 Complete". The FBSC may be changed to reflect "Stage1 Complete" from "Initialization Complete". As discussed above, the FBSC may indicate the current progress of the full backup operation process. In one or more embodiments of the invention, "Stage1 Complete" may reflect one of the checkpoints in the full backup operation. If the FBSC is "Stage1 Complete", then the FBSC is indicating that the full backup operation may was successfully initiated and the full backup data file image(s) may were successfully generated and written into the working directory.

In Step 242, the full backup data file image(s) (stored in the working directory) is cloned into the snapshot directory (on the backup storage system). In one embodiment of the invention, cloning of a given backup data file image may entail generating a pointer-based snapshot of the given backup data file image. That is, rather than cloning or copying the physical database data itself, associated with the given backup data file image, generation of a pointer-based snapshot exercises the cloning or copying of the content recipe (described above). Subsequently, the cloning process of any given backup data file image is rapid despite the physical storage space consumed by the associated physical database data; and, further, the cloning process results in the obtaining of a backup data file image copy for each backup data file image, which consumes little to no physical storage capacity as discussed above. Moreover, in another embodiment of the invention, for each given backup data file image that was cloned, which had been stored in a first directory path (i.e., the working directory), the respective backup data file images may be stored in a second directory path (i.e., the snapshot directory) on the backup storage system.

Figure 2C:
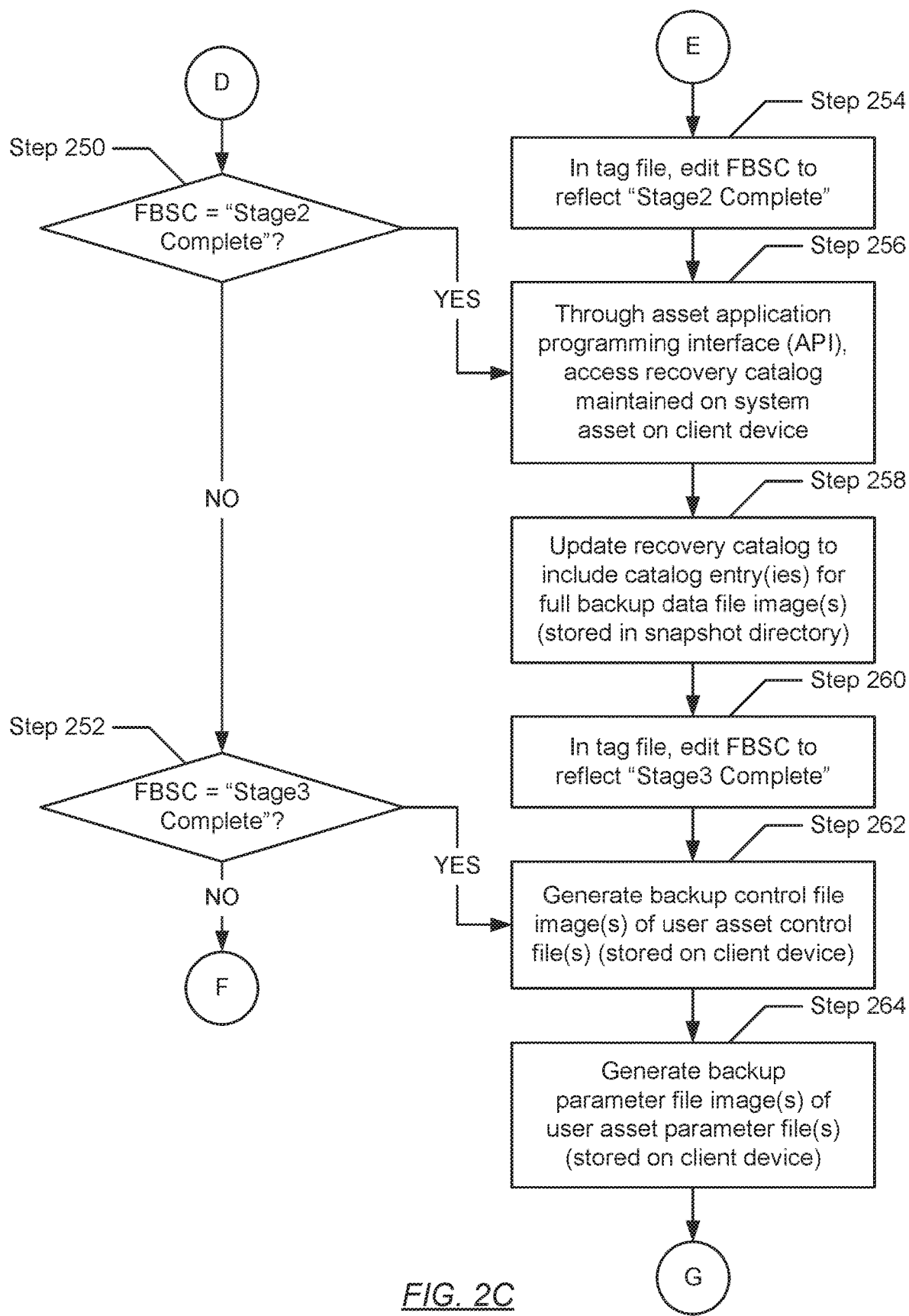

Turning to FIG. 2C, in Step 250, a determination is made as to whether the FBSC is "Stage2 Complete". Accordingly, in one embodiment of the invention, if it is determined that the FBSC is "Stage2 Complete", then the method proceeds to Step 256. On the other hand, in another embodiment of the invention, if it is alternatively determined that the FBSC is not "Stage2 Complete", then the method proceeds to Step 252.

In Step 252, a determination is made as to whether the FBSC is "Stage3 Complete". Accordingly, in one embodiment of the invention, if it is determined that the FBSC is "Stage3 Complete", then the method proceeds to Step 262. On the other hand, in another embodiment of the invention, if it is alternatively determined that the FBSC is not "Stage3 Complete", then the method proceeds to Step 270 of FIG. 2D.

In Step 254, the FBSC in the tag file is edited (or otherwise updated) to reflect "Stage2 Complete". The FBSC may be changed to reflect "Stage2 Complete" from "Stage1 Complete". As discussed above, the FBSC may indicate the current progress of the full backup operation process. In one or more embodiments of the invention, "Stage2 Complete" may reflect one of the checkpoints in the full backup operation. If the FBSC is "Stage2 Complete", then the FBSC may indicate that the full backup data file image(s) stored in the working directory were successfully cloned into the snapshot directory.

In Step 256, a recovery catalog maintained on a system asset on the client device is accessed through an asset application programming interface (API). The asset API may enable the client device and/or entities on the client device to access and modify data files on the system asset of the client device as discussed above. Furthermore, the recovery catalog may include metadata regarding backup operations and associated data file images stored in the backup storage system as discussed above.

In Step 258, the recovery catalog is updated to include a catalog entry(ies) for the full backup data file image(s) stored in the snapshot directory. Updating the recovery catalog may entail informing the client device of the existence of the new full backup data file image(s) generated and stored in the snapshot directory on the backup storage system during the full backup operation. In one embodiment of the invention, the recovery catalog may be updated to include metadata regarding the full backup operation and the new full backup data file image(s) included therein. The metadata included in the recovery catalog may be, for example, timestamps encoding dates and/or times during which the new full backup data file image(s) had been stored into the snapshot directory and/or synthesized in the working directory; backup identifiers or names associated with the new full backup data file image(s); a directory path in the backup file system at which the new full backup data file image(s) may be found, etc.

In Step 260, the FBSC in the tag file is edited (or otherwise updated) to reflect "Stage3 Complete". The FBSC may be updated to reflect "Stage3 Complete" from "Stage2 Complete". As discussed above, the FBSC may indicate the current progress of the full backup operation process. In one or more embodiments of the invention, "Stage3 Complete" may reflect one of the checkpoints in the full backup operation. If the FBSC reflects "Stage3 Complete", then the FBSC may indicate that the recovery catalog was successfully updated to include catalog entry(ies) for the generated full backup data file image(s) that were stored in the snapshot directory on the backup storage system.

In Step 262, a backup control file image(s) of an user asset control file(s) stored on the client device is/are generated. Further, the backup control file image(s) may be generated in deduplicated form and, thus, may include a content recipe (as described above). In one embodiment of the invention, the content recipe may convey a sequence of fingerprints collectively representative of the undeduplicated backup control file image content.

In Step 264, a backup parameter file image(s) of an user asset parameter file(s) stored on the client device is/are generated. Further, the backup parameter file image(s) may be generated in deduplicated form and, thus, may include a content recipe (as described above). In one embodiment of the invention, the content recipe may convey a sequence of fingerprints collectively representative of the undeduplicated backup parameter file image content.

Figure 2D:
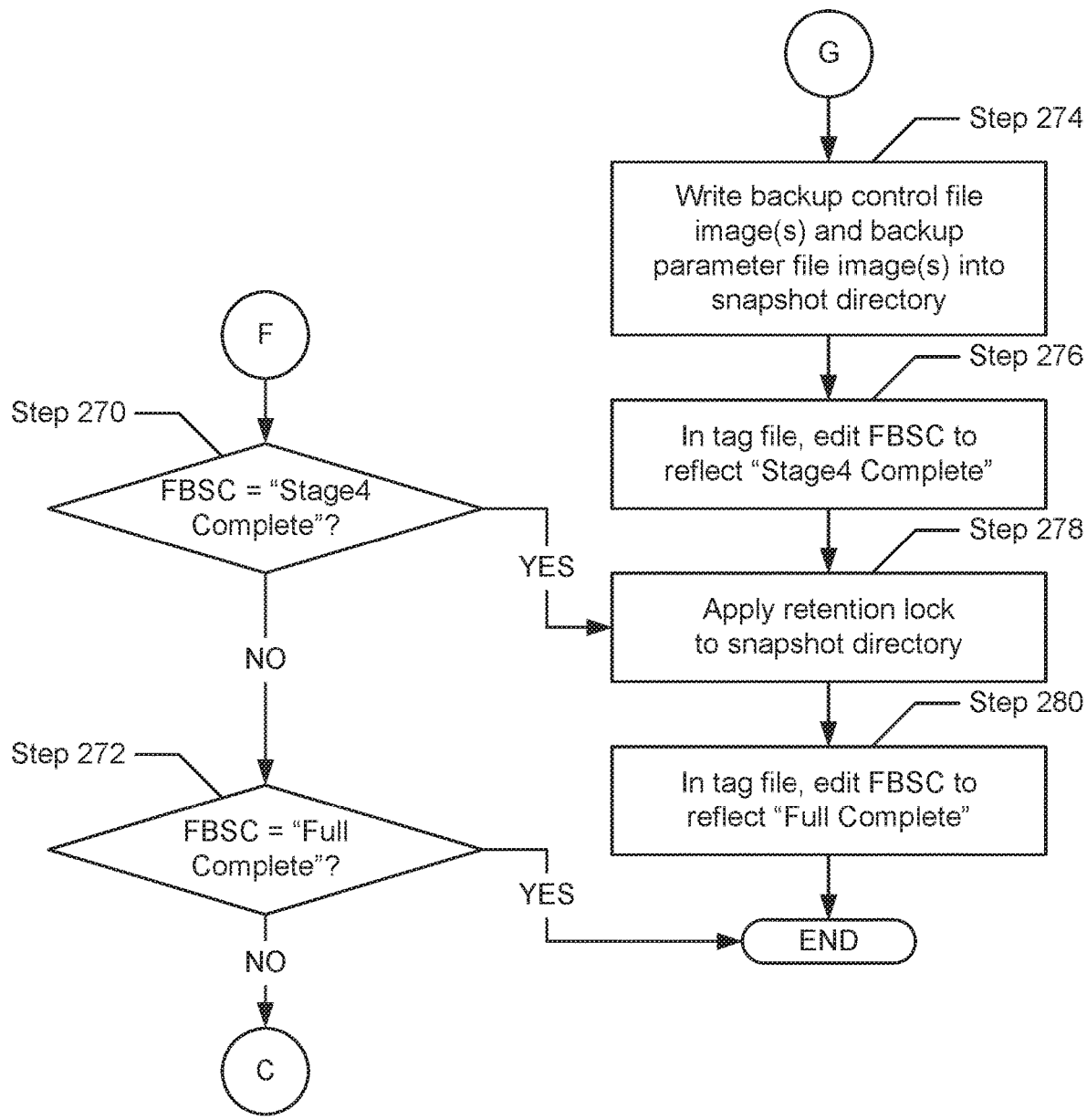

Turning to FIG. 2D, in Step 270, a determination is made as to whether the FBSC is "Stage4 Complete". Accordingly, in one embodiment of the invention, if it is determined that the FBSC is "Stage4 Complete", then the method proceeds to Step 278. On the other hand, in another embodiment of the invention, if it is alternatively determined that the FBSC is not "Stage4 Complete", then the method proceeds to Step 272.

In Step 272, a determination is made as to whether the FBSC is "Full Complete". Accordingly, in one embodiment of the invention, if it is determined that the FBSC is "Full Complete", then the method end following Step 272. On the other hand, in another embodiment of the invention, if it is alternatively determined that the FBSC is not "Full Complete", then the method proceeds to Step 214 of FIG. 2A.

In Step 274, the backup control file image(s) and the backup parameter file image(s) are written into the snapshot directory. In one or more embodiments of the invention, the backup control file image(s) and the backup parameter file image(s) may be written into the snapshot directory serially or in parallel. Writing backup control file and backup parameter file image(s) serially may include writing backup control file and parameter file images, if there are more than one, one by one. For example, the first backup control file or parameter file image is written into the snapshot directory. After the first backup control file or parameter file image is successfully written into the snapshot directory, then the second backup control file or parameter file image is written into the snapshot directory and so on until all of the backup control file images are successfully written into the snapshot directory. Writing backup control file and/or parameter file images in parallel may include writing all of the backup control file and/or parameter file images into the snapshot directory at the same time.

In Step 276, the FBSC in the tag file is edited (or otherwise updated) to reflect "Stage4 Complete". The FBSC may be updated to reflect "Stage4 Complete" from "Stage3 Complete". As discussed above, the FBSC may indicate the current progress of the full backup operation process. In one or more embodiments of the invention, "Stage4 Complete" may reflect one of the checkpoints in the full backup operation. If the FBSC reflects "Stage4 Complete", then the FBSC may indicate that the backup control file and backup parameter file image(s) are successfully generated and written into the snapshot directory.

In Step 278, a retention lock is applied to the snapshot directory. In one embodiment of the invention, locking the backup image(s) in the snapshot directory may entail preventing the manipulation and/or deletion of the backup images(s) from the snapshot directory by users of the system. The backup images that are retention locked may not be deleted or modified in any way for the duration of the specified retention period. The retention period may include a specific amount of time backup image(s) may not be modified or deleted. The backup image(s) may be modified or deleted after the retention period ends. The backup image(s) may include full backup data file image(s), backup control file image(s), and/or backup parameter file image(s).

In Step 280, the FBSC in the tag file is edited (or otherwise updated) to reflect "Full Complete". The FBSC may be updated to reflect "Full Complete" from "Stage4 Complete". As discussed above, the FBSC may indicate the current progress of the full backup operation process. In one or more embodiments of the invention, "Full Complete" may reflect one of the checkpoints in the full backup operation. If the FBSC reflects "Full Complete", then the FBSC may indicate that the full backup operation was successfully completed.

The method may end following Step 280.

FIGS. 3A-3E show flowcharts describing a method for resuming interrupted database incremental backup operations using checkpoints in accordance with one or more embodiments of the invention. The various steps outlined below may be performed by the client protection agent (see e.g., FIG. 1B). Further, while the various steps in the flowcharts are presented and described sequentially, one of ordinary skill will appreciate that some or all steps may be executed in different orders, may be combined or omitted, and some or all steps may be executed in parallel.

Figure 3A:
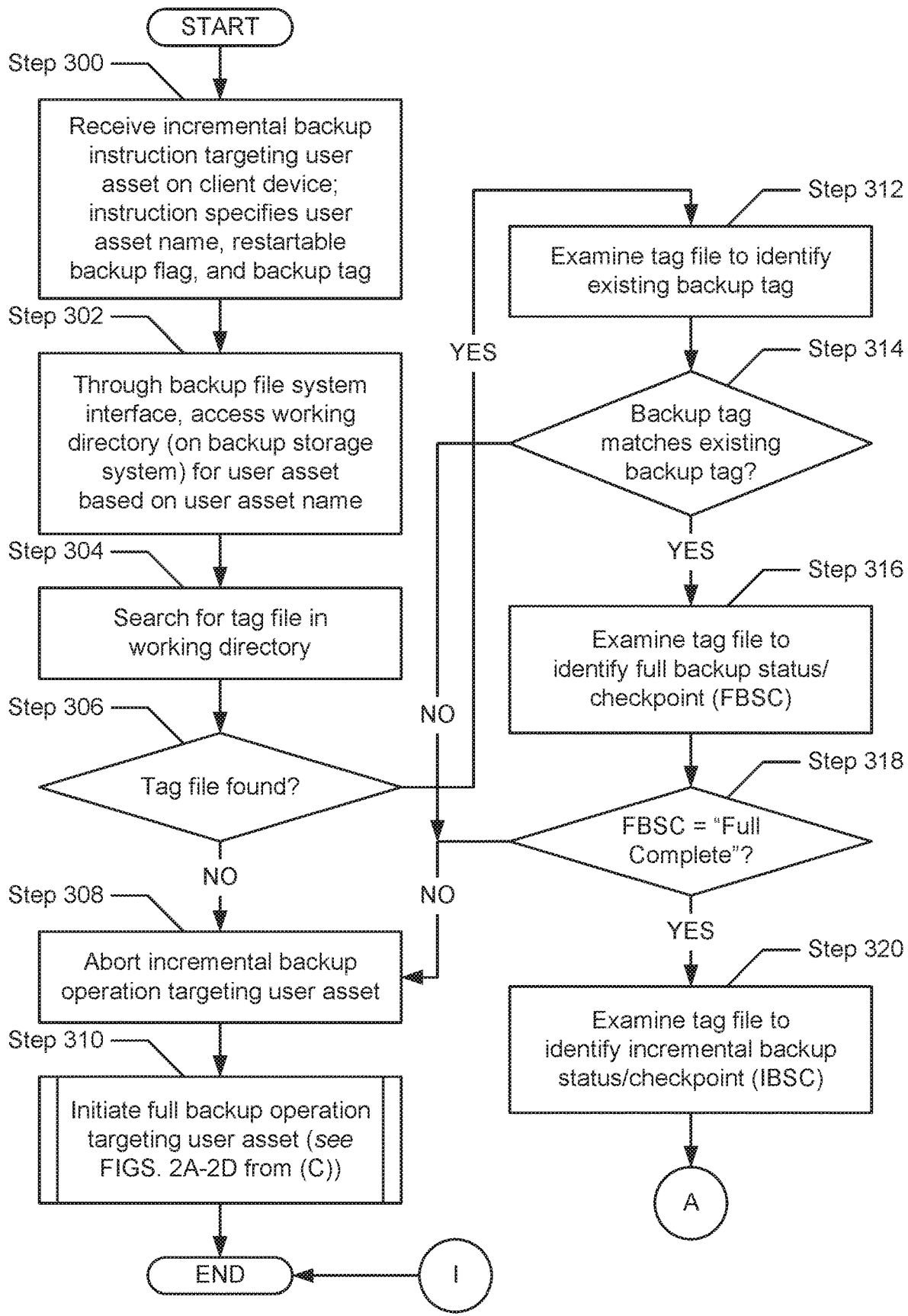
FIGS. 3A-3E show flowcharts describing a method for resuming interrupted database incremental backup operations using checkpoints in accordance with one or more embodiments of the invention.

Turning to FIG. 3A, in Step 300, an incremental backup instruction targeting an user asset on a client device is received. In one embodiment of the invention, the instruction may specify the user asset name, the restartable backup flag, and the backup tag. The user asset name may be an identifier unique to each user asset on the client device that may be used to specify a particular user asset. The restartable backup flag may include a binary value or parameter that may be enabled or disabled which indicates whether the previous existing backup was configured to be restartable. The backup tag may be used to identify backup operations and may include associated backup operation information.

In Step 302, a working directory on the backup storage system for the user asset is accessed based on the user asset name through the backup file system interface. In one or more embodiments of the invention, the backup file system interface allows the client device and entities within to access and manipulate directories and files on the backup storage system. The client device or entities on the client device may use an user asset name to identify and access the working directory associated with the full backup operation.

In Step 304, a tag file is searched for in the working directory. In one embodiment of the invention, the tag file may include metadata regarding the backup operations and associated data within the working directory. The tag file may at least specify one or more existing backup tags.

In Step 306, a determination is made as to whether the tag file is found. Accordingly, in one embodiment of the invention, if it is determined that tag file is found, then the method proceeds to Step 312. On the other hand, in another embodiment of the invention, if it is alternatively determined that the tag file is not found, then the method proceeds to Step 308.

In Step 308, in response to the determination that no tag file was found in the working directory of Step 306 or the determination the backup tag does not match the existing backup tag of Step 314, the incremental backup operation targeting the user asset is aborted. An incremental backup operation may not be able to be performed if no tag file was found, which indicates that no full backup operation of the targeted user asset has been performed yet. Additionally, the incremental backup operation may be aborted if the backup tag does not match the existing backup tag, which may indicate the incremental backup operation is targeting a different user asset than the one that is associated with the existing backup tag. The incremental backup operation may be aborted based on the aforementioned determinations to avoid data loss and/or data corruption.

In Step 310, a full backup operation targeting the user asset is initiated. As a result, one or more full backup data file images and a backup tag associated with the targeted user asset may be present in the working directory that may be required for a subsequent incremental backup operation. Moreover, the full backup operation is described in further detail above with respect to FIGS. 2A-2D from (C).

The method may end following Step 310.

In Step 312, the tag file is examined to identify an existing backup tag. The existing backup tag may encode existing backup operation identifiers that may be used to verify if a new backup operation is restarting the existing backup operation. For example, if the backup tag located on the tag file in the working directory matches the backup tag included in the incremental backup instruction (obtained in Step 300), then the current backup operation may be targeting user asset data that may have been already backed up in the previous backup operation. On the other hand, if the backup tags (from the incremental backup instruction and the working directory) do not match, then the current backup operation may be targeting user asset data that has not been backed-up or is not associated with the user asset data currently in the working directory.

In Step 314, a determination is made as whether the backup tag matches the existing backup tag. Accordingly, in one embodiment of the invention, if it is determined that the backup tag matches the existing backup tag, then the method proceeds to Step 316. On the other hand, in another embodiment of the invention, if it alternatively determined that the backup does not tag match the existing backup tag, then the method proceeds to Step 308.

In Step 316, the tag file is examined to identify a full backup status/checkpoint (FBSC). In one or more embodiments of the invention, the FBSC may include the status of the full backup operation. The status may include checkpoints that indicate the current progress of the full backup operation process. The backup operation may include several checkpoints. The checkpoints may include "Initialization Complete", "Stage1 Complete", "Stage2 Complete", "Stage3 Complete", "Stage4 Complete", and "Full Complete" (described above) (e.g., see FIGS. 2A-2D).

In Step 318, a determination is made as to whether the FBSC is "Full Complete". Accordingly, in one embodiment of the invention, if it is determined that the FBSC is "Full Complete", then the method proceeds to Step 320. On the other hand, in another embodiment of the invention, if it is alternatively determined that the FBSC is not "Full Complete", then the method proceeds to Step 308.

In Step 320, the tag file is examined to identify an incremental backup status/checkpoint (IBSC). In one or more embodiments of the invention, the IBSC may include the status of the incremental backup operation. The status may include checkpoints that indicate the current progress of the incremental backup operation process. The backup operation may include several checkpoints. The checkpoints may include, "Stage1 Complete", "Stage2 Complete", "Stage3 Complete", "Stage4 Complete", "Stage5 Complete", and "Incremental Complete" (described below).

Figure 3B:
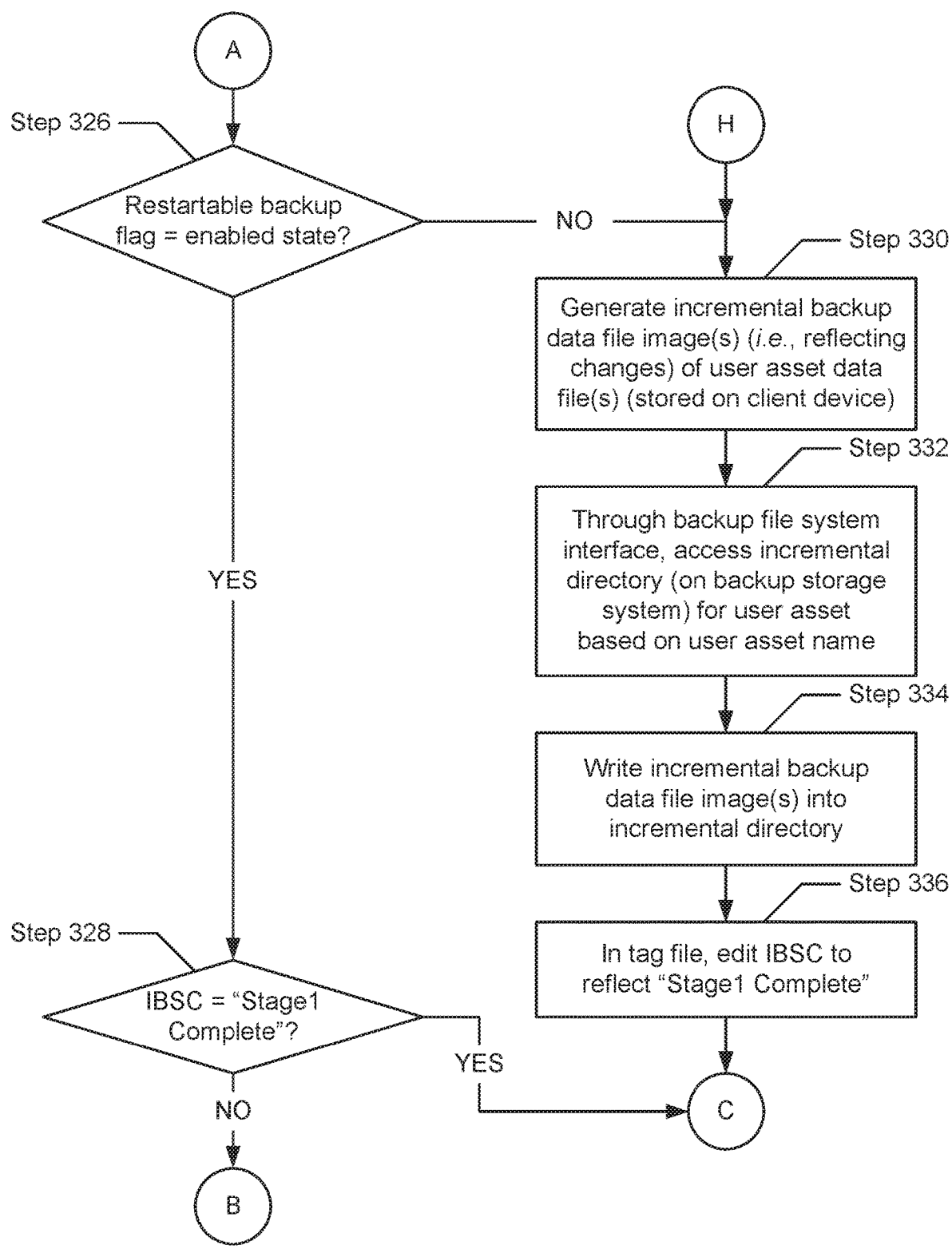

Turning to FIG. 3B, in Step 326, a determination is made as to whether the restartable backup flag is in the enabled state. Accordingly, in one embodiment of the invention, if it is determined that the restartable backup flag is in the enabled state, then the method proceeds to Step 328. On the other hand, in another embodiment of the invention, if it is alternatively determined that the restartable backup flag is not in the enabled state (i.e., the restartable backup flag is in the disabled state), then the method proceeds to Step 330.

In Step 328, a determination is made as to whether the IBSC is "Stage1 Complete". Accordingly, in one embodiment of the invention, if it is determined that the IBSC is "Stage1 Complete", then the method proceeds to Step 346 of FIG. 3C. On the other hand, in another embodiment of the invention, if it is alternatively determined that the IBSC is not "Stage1 Complete", then the method proceeds to Step 342 of FIG. 3C.

In Step 330, an incremental backup data file image(s) (i.e., reflecting changes) of an user asset data file(s) stored on the client device is/are generated. The incremental backup data file image(s) may reflect the changes to the database data of the for the given distinct data files of the targeted user asset stored on the client device since the previous backup operation of the targeted user asset. Further, the incremental backup data file image(s) may be in deduplicated form and, thus, may include a content recipe. In one embodiment of the invention, the content recipe may convey a sequence of fingerprints collectively representative of the undeduplicated incremental backup content.

In Step 332, an incremental directory on the backup storage system for the user asset is accessed based on the user asset name through the backup file system interface. In one embodiment of the invention, the backup file system interface may allow the client device and entities within to access and manipulate directories and files on the backup storage system. The client device or entities on the client device may use an user asset name to identify and access the incremental directory associated with the incremental backup operation.

In Step 334, the incremental backup data file image(s) is/are written into the incremental directory. In one or more embodiments of the invention, the incremental backup data file image(s) may be written into the incremental directory serially or in parallel. Writing incremental backup data file image(s) serially may include writing incremental backup data file images, if there are more than one, one by one. For example, the first incremental backup data file image is written into the incremental directory. After the first incremental backup data file image is successfully written into the incremental directory, then the second incremental backup data file image is written into the incremental directory and so on until all of the incremental backup data file images are successfully written into the incremental directory. Writing incremental backup data file images in parallel may include writing all of the incremental backup data file images into the incremental directory at the same time.

In Step 336, the IBSC is edited (or otherwise updated) in the tag file to reflect "Stage1 Complete". The IBSC may be updated to reflect "Stage1 Complete". As discussed above, the IBSC may indicate the current progress of the incremental backup operation process. In one or more embodiments of the invention, "Stage1 Complete" may reflect one of the checkpoints in the incremental backup operation. If the IBSC reflects "Stage1 Complete", then the IBSC may indicate that the generation of one or more incremental backup data file images into the snapshot directory has successfully been completed.

Figure 3C:
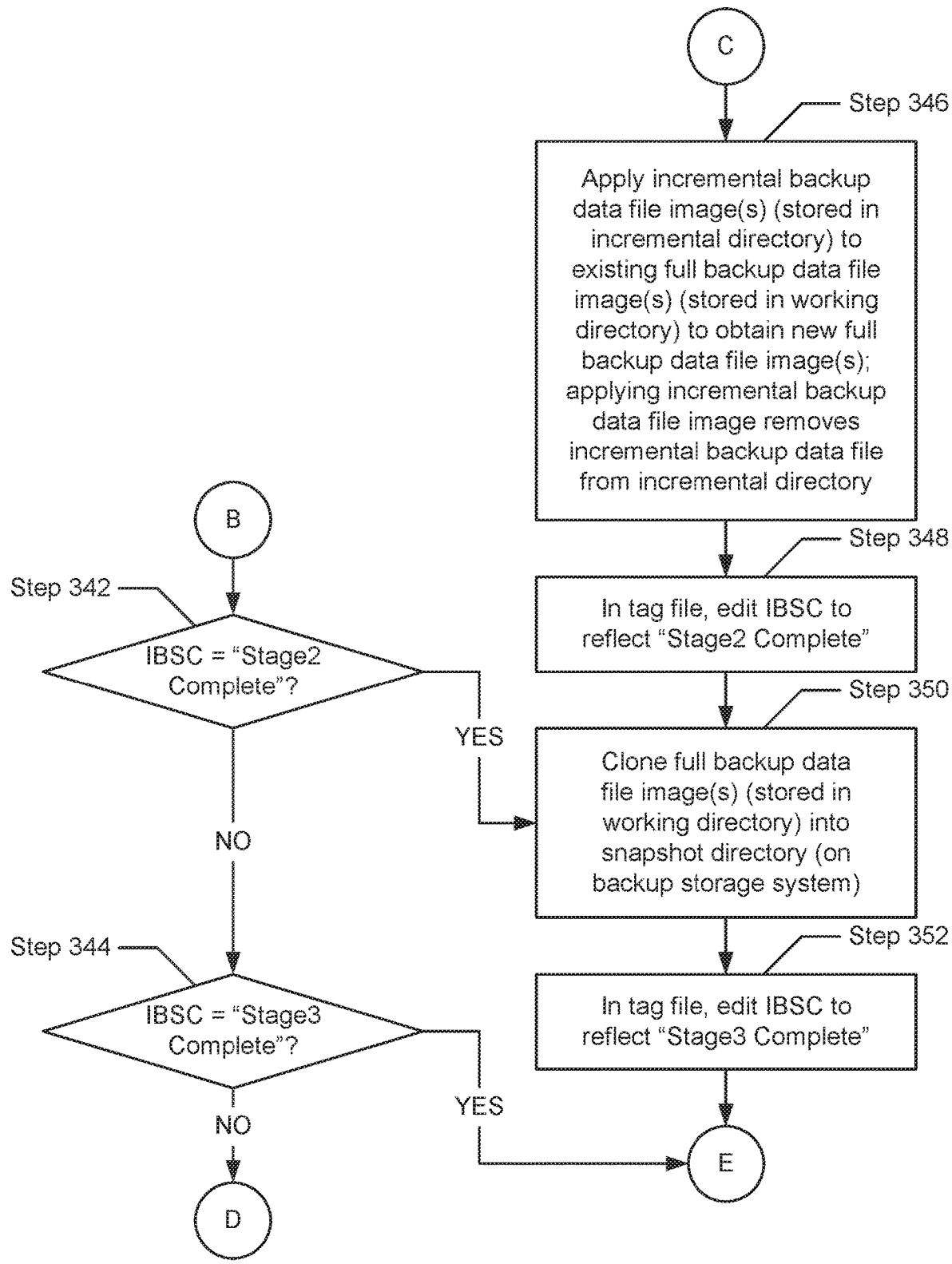

Turning to FIG. 3C, in Step 342, a determination is made as to whether the IBSC is "Stage2 Complete". Accordingly, in one embodiment of the invention, if it is determined that the IBSC is "Stage2 Complete", then the method proceeds to Step 350. On the other hand, in another embodiment of the invention, if it is alternatively determined that the IBSC is not "Stage2 Complete", then the method proceeds to Step 344.

In Step 344, a determination is made as to whether the IBSC is "Stage3 Complete". Accordingly, in one embodiment of the invention, if it is determined that the IBSC is "Stage3 Complete", then the method proceeds to Step 360 of FIG. 3D. On the other hand, in another embodiment of the invention, if it is alternatively determined that the IBSC is not "Stage3 Complete", then the method proceeds to Step 358 of FIG. 3D.

In Step 346, the incremental backup data file image(s) (stored in the incremental directory) is/are applied to the existing full backup data file image(s) (stored in the working directory) to obtain one or more new full backup data file images. In one embodiment of the invention, applying the incremental backup data file image(s) may remove the incremental backup data file image(s) from the incremental directory. The aforementioned application of incremental backup data file image(s) to existing full backup data file image(s) may entail applying any database data changes, recorded in the incremental backup data file image(s), onto the full backup data file image(s), thereby creating a new full backup data file image(s). Further, the new full backup data file image(s) may be retained in deduplicated form, similar to the full backup data file image(s) or the incremental backup data file image(s). Accordingly, the new full backup data file image may include a content recipe representative of the new full backup content.

In Step 348, the IBSC in the tag file is edited (or otherwise updated) to reflect "Stage2 complete". The IBSC may be updated to reflect "Stage2 Complete" from "Stage1 Complete". As discussed above, the IBSC may indicate the current progress of the incremental backup operation process. In one or more embodiments of the invention, "Stage2 Complete" may reflect one of the checkpoints in the incremental backup operation. If the IBSC reflects "Stage2 Complete", then the IBSC may indicate that one or more incremental backup data file images have successfully been applied to one or more full backup data file images in the working directory to obtain one or more new full backup data file images.

In Step 350, the full backup data file image(s) (stored in the working directory) is/are cloned into the snapshot directory (on the backup storage system). In one embodiment of the invention, cloning of a given backup data file image may entail generating a pointer-based snapshot of the given backup data file image. That is, rather than cloning or copying the physical database data itself, associated with the given backup data file image, generation of a pointer-based snapshot exercises the cloning or copying of the age content recipe (described above). Subsequently, the cloning process of any given backup data file image is rapid despite the physical storage space consumed by the associated physical database data; and, further, the cloning process results in the obtaining of a backup data file image copy for each backup data file image, which consumes little to no physical storage capacity as discussed above. Moreover, in another embodiment of the invention, for each given backup data file image that was cloned, which had been stored in a first directory path (i.e., the working directory), the respective backup data file images may be stored in a second directory path (i.e., the snapshot directory) on the backup storage system.

In Step 352, the IBSC in the tag file is edited (or otherwise updated) to reflect "Stage3 Complete". The IBSC may be updated to reflect "Stage3 Complete" from "Stage2 Complete". As discussed above, the IBSC may indicate the current progress of the incremental backup operation process. In one or more embodiments of the invention, "Stage3 Complete" may reflect one of the checkpoints in the incremental backup operation. If the IBSC reflects "Stage3 Complete", then the IBSC may indicate that one or more new full backup data file images have successfully been cloned from the working directory into the snapshot directory.

Figure 3D:
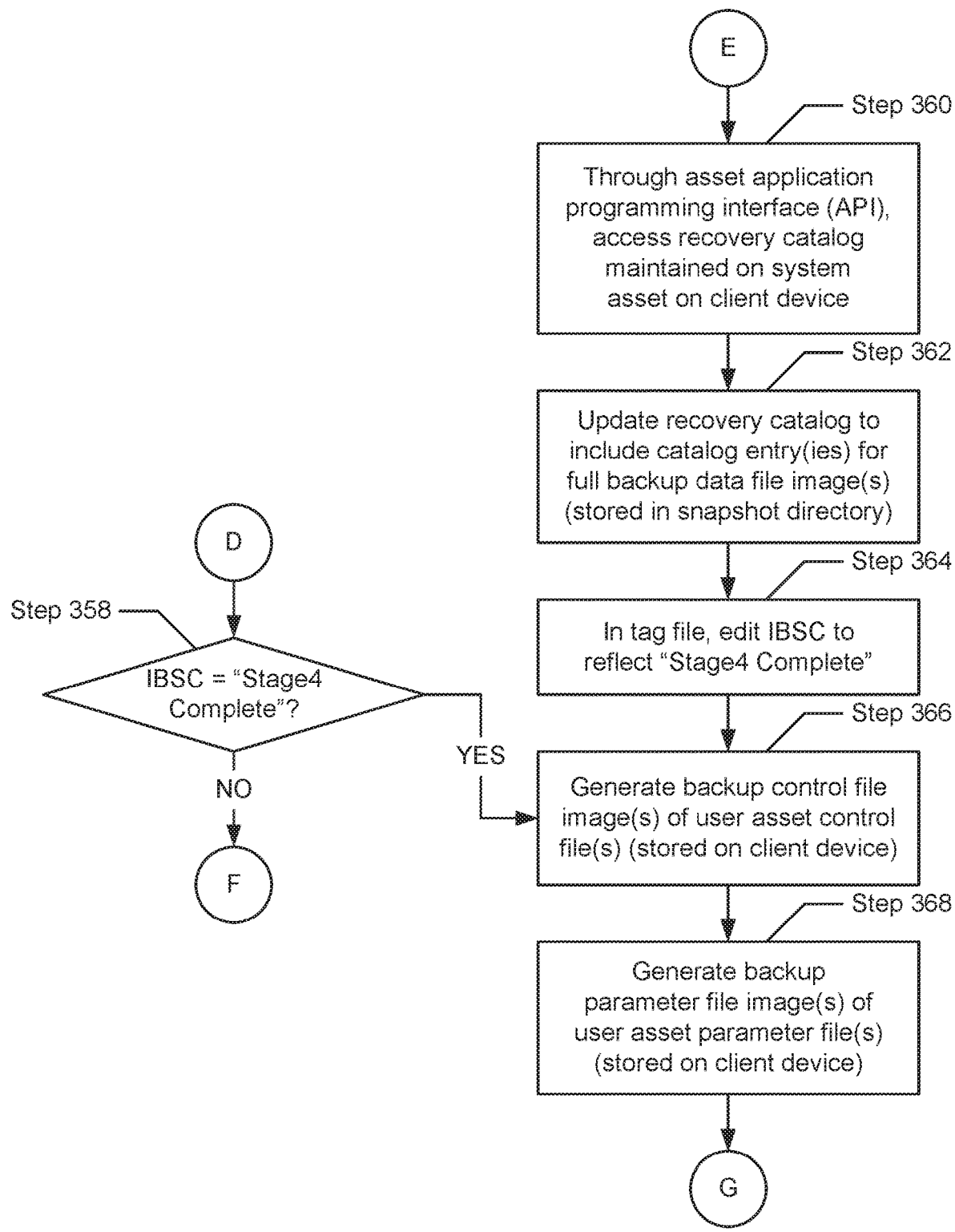

Turning to FIG. 3D, In Step 358, a determination is made as to whether the IBSC is "Stage4 Complete". Accordingly, in one embodiment of the invention, if it is determined that the IBSC is "Stage4 Complete", then the method proceeds to Step 366. On the other hand, in another embodiment of the invention, if it is alternatively determined that the IBSC is not "Stage4 Complete", then the method proceeds to Step 374 of FIG. 3E.

In Step 360, a recovery catalog maintained in a system asset on the client device is accessed through an asset application programming interface (API). The asset API may enable the client device and/or entities on the client device to access and modify data files on the system asset of the client device as discussed above. Furthermore, the recovery catalog may include metadata regarding backup operations and associated data file images stored in the backup storage system as discussed above.

In Step 362, the recovery catalog is updated to include a catalog entry(ies) for the full backup data file image(s) (stored in the snapshot directory). Updating the recovery catalog may entail informing the client device of the existence of the new full backup data file image(s) generated and stored in the snapshot directory on the backup storage system during the incremental backup operation. In one embodiment of the invention, the recovery catalog may be updated to include metadata regarding the full backup operation and the new full backup data file image(s) included therein. The metadata included in the recovery catalog may be, for example, timestamps encoding dates and/or times during which the new full backup data file image(s) had been stored into the snapshot directory and/or synthesized in the working directory; backup identifiers or names associated with the new full backup data file image(s); a directory path in the backup file system at which the new full backup data file image(s) may be found, etc.

In Step 364, the IBSC in the tag file is edited (or otherwise updated) to reflect "Stage4 Complete". The IBSC may be updated to reflect "Stage4 Complete" from "Stage3 Complete". As discussed above, the IBSC may indicate the current progress of the incremental backup operation process. In one or more embodiments of the invention, "Stage4 Complete" may reflect one of the checkpoints in the incremental backup operation. If the IBSC reflects "Stage4 Complete", then the IBSC may indicate that one or more catalog entries have successfully been included in the recovery catalog regarding the new full backup data file image(s) in the snapshot directory.

In Step 366, a backup control file image(s) of the user asset control file(s) (stored on the client device) is generated. Further, the backup control file image(s) may be generated in deduplicated form and, thus, may include a content recipe (described above). In one embodiment of the invention, the content recipe may convey a sequence of fingerprints collectively representative of the undeduplicated backup control file image content.

In Step 368, a backup parameter file image(s) of the user asset parameter file(s) (stored on the client device) is generated. Further, the backup parameter file image(s) may be generated in deduplicated form and, thus, may include a content recipe (described above). In one embodiment of the invention, the content recipe may convey a sequence of fingerprints collectively representative of the undeduplicated backup parameter file image content.

Figure 3E:
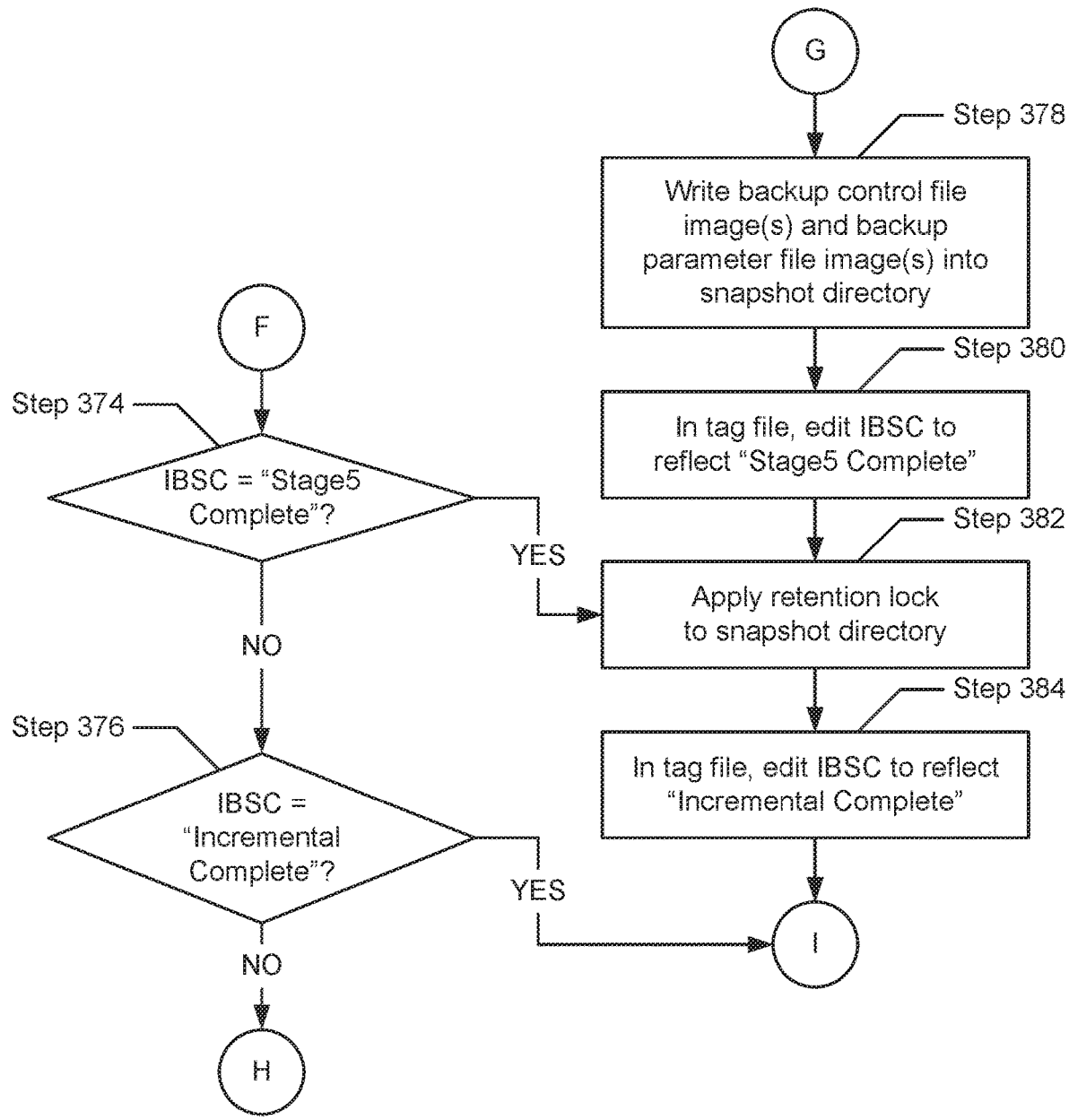

Turning to FIG. 3E, in Step 374, a determination is made as to whether the IBSC is "Stage5 Complete". Accordingly, in one embodiment of the invention, if it is determined that the IBSC is "Stage5 Complete", then the method proceeds to Step 382. On the other hand, in another embodiment of the invention, if it is alternatively determined that the IBSC is not "Stage5 Complete", then the method proceeds to Step 376.

In Step 376, a determination is made as to whether the IBSC is "Incremental Complete". Accordingly, in one embodiment of the invention, if it is determined that the IBSC is "Incremental Complete", then the method ends. On the other hand, in another embodiment of the invention, if it is alternatively determined that the IBSC is not "Incremental Complete", then the method proceeds to Step 330 of FIG. 3B.

In Step 378, the backup control file image(s) and the parameter file image(s) are written into the snapshot directory. In one or more embodiments of the invention, the backup control file image(s) and the backup parameter file image(s) may be written into the snapshot directory serially or in parallel. Writing backup control file and backup parameter file image(s) serially may include writing backup control file and parameter file images, if there are more than one, one by one. For example, the first backup control file or parameter file image is written into the snapshot directory. After the first backup control file or parameter file image is successfully written into the snapshot directory, then the second backup control file or parameter file image is written into the snapshot directory and so on until all of the backup control file images are successfully written into the snapshot directory. Writing backup control file and/or parameter file images in parallel may include writing all of the backup control file and/or parameter file images into the snapshot directory at the same time.

In Step 380, the IBSC in the tag file is edited (or otherwise updated) to reflect "Stage5 Complete". The IBSC may be updated to reflect "Stage5 Complete" from "Stage4 Complete". As discussed above, the IBSC may indicate the current progress of the incremental backup operation process. In one or more embodiments of the invention, "Stage5 Complete" may reflect one of the checkpoints in the incremental backup operation. If the IBSC reflects "Stage5 Complete", then the IBSC may indicate that one or more backup control file images and backup parameter file images have been successfully written into the snapshot directory.

In Step 382, the retention lock is applied to the snapshot directory. In one embodiment of the invention, locking the backup image(s) in the snapshot directory may entail preventing the manipulation and/or deletion of the backup images(s) from the snapshot directory by users of the system. The backup images that are retention locked may not be deleted or modified in any way for the duration of the specified retention period. The retention period may include a specific amount of time backup image(s) may not be modified or deleted. The backup image(s) may be modified or deleted after the retention period ends. The backup image(s) may include full backup data file image(s), backup control file image(s), and/or backup parameter file image(s).

In Step 384, the IBSC in the tag file is edited (or otherwise updated) to reflect "Incremental Complete". The IBSC may be updated to reflect "Incremental Complete" from "Stage5 Complete". As discussed above, the IBSC may indicate the current progress of the incremental backup operation process. In one or more embodiments of the invention, "Incremental Complete" may reflect one of the checkpoints in the incremental backup operation. If the IBSC reflects "Incremental Complete", then the IBSC may indicate that the incremental backup operation has been successfully completed.

The method may end following Step 384.

Figure 4:
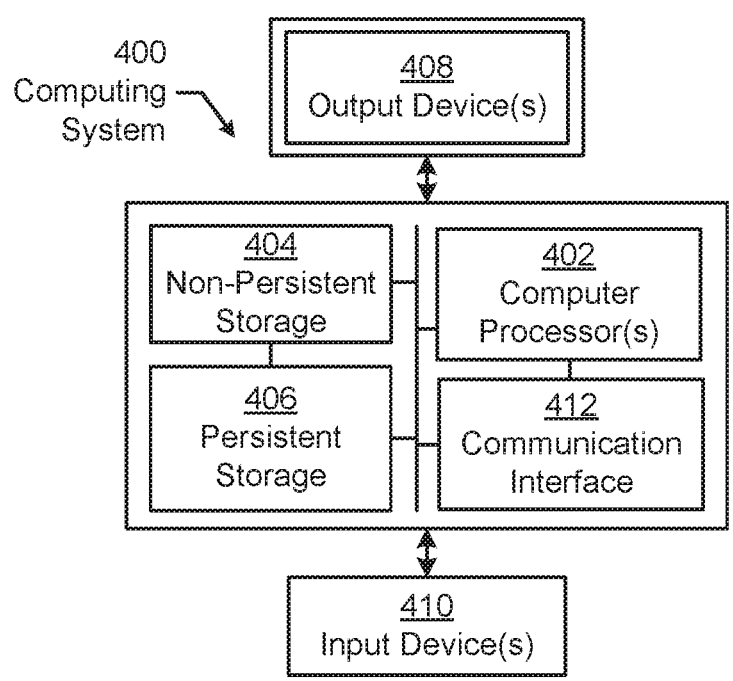
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for backing up data, the method comprising:
receiving a backup instruction from a client device, wherein the backup instruction comprises a first backup tag corresponding to a backup operation for a user asset;
making a first determination that the first backup tag matches a second backup tag specified in a tag file, wherein the tag file further comprises metadata regarding the backup operation and the tag file is separate from a file comprising a backup data file image of the user asset;
making a second determination that the backup operation is restartable by evaluating a restartable backup flag associated with the backup operation;
in response to the first determination and after the second determination, identifying a checkpoint of a backup associated with the second backup tag; and
resuming the backup operation at the checkpoint for the user asset, wherein the first backup tag and the second backup tag comprise an identifier that the backup operation is one selected from a group consisting of a full backup instruction and an incremental backup instruction.

2. The method of claim 1, wherein the checkpoint is one of a plurality of checkpoints associated with the backup operation.

3. A system, comprising:
a processor;
a memory, coupled to the processor and comprising instructions stored therein;
a client protection agent comprising instructions stored in the memory, which when executed by the processor performs a method, the method comprising:
receiving a backup instruction from a client device, wherein the backup instruction comprises a first backup tag corresponding to a backup operation for a user asset;
making a first determination that the first backup tag matches a second backup tag specified in a tag file, wherein the tag file further comprises metadata regarding the backup operation and the tag file is separate from a file comprising a backup data file image of the user asset;
making a second determination that the backup operation is restartable by evaluating a restartable backup flag associated with the backup operation;
in response to the first determination and after the second determination, identifying a checkpoint of a backup associated with the second backup tag; and
resuming the backup operation at the checkpoint for the user asset, wherein the first backup tag and the second backup tag comprise an identifier that the backup operation is one selected from a group consisting of a full backup instruction and an incremental backup instruction.

4. The system of claim 3, wherein the checkpoint is one of a plurality of checkpoints associated with the backup operation.

5. A non-transitory computer readable medium comprising computer readable program code, which when executed by a computer processor enables the computer processor to perform a method, the method comprising:
receiving a backup instruction from a client device, wherein the backup instruction comprises a first backup tag corresponding to a backup operation for a user asset;
making a first determination that the first backup tag matches a second backup tag specified in a tag file, wherein the tag file further comprises metadata regarding the backup operation and the tag file is separate from a file comprising a backup data file image of the user asset;
second determination that the backup operation is restartable by evaluating a restartable backup flag associated with the backup operation; in response to the first determination and after the second determination, identifying a checkpoint of a backup associated with the second backup tag; and
resuming the backup operation at the checkpoint for the user asset, wherein the first backup tag and the second backup tag comprise an identifier that the backup operation is one selected from a group consisting of a full backup instruction and an incremental backup instruction.

6. The non-transitory computer readable medium of claim 5, wherein the checkpoint is one of a plurality of checkpoints associated with the backup operation.

* * * * *